(12) United States Patent
Ran et al.

(10) Patent No.: US 12,325,434 B2
(45) Date of Patent: Jun. 10, 2025

(54) VEHICLE INTELLIGENT UNIT

(71) Applicant: CAVH LLC, Fitchburg, WI (US)

(72) Inventors: Bin Ran, Fitchburg, WI (US); Kegang Zhao, Madison, WI (US); Hanchu Li, Madison, WI (US); Mingheng Zhang, Madison, WI (US); Shen Li, Madison, WI (US); Yang Cheng, Middleton, WI (US); Zhijun Chen, Madison, WI (US); Jie Ye, Madison, WI (US); Shuoxuan Dong, Madison, WI (US); Haotian Shi, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 59 days.

(21) Appl. No.: 17/718,443

(22) Filed: Apr. 12, 2022

(65) Prior Publication Data

US 2022/0332337 A1    Oct. 20, 2022

Related U.S. Application Data

(60) Provisional application No. 63/175,158, filed on Apr. 15, 2021.

(51) Int. Cl.
*B60W 50/06* (2006.01)
*B60W 50/023* (2012.01)
*B60W 60/00* (2020.01)

(52) U.S. Cl.
CPC .......... *B60W 50/06* (2013.01); *B60W 60/001* (2020.02); *B60W 50/023* (2013.01); *B60W 2050/065* (2013.01); *B60W 2556/35* (2020.02)

(58) Field of Classification Search
CPC .. B60W 50/06; B60W 60/001; B60W 50/023; B60W 2050/065; B60W 2556/35; G05D 1/0055
See application file for complete search history.

(56) References Cited

U.S. PATENT DOCUMENTS

| | | | |
|---|---|---|---|
| 10,380,886 B2 | 8/2019 | Ran et al. | |
| 10,692,365 B2 | 6/2020 | Ran et al. | |
| 10,867,512 B2 | 12/2020 | Ran et al. | |
| 11,468,285 B1* | 10/2022 | Tang | B60W 60/0027 |
| 11,495,126 B2 | 11/2022 | Ding et al. | |
| 2019/0051159 A1 | 2/2019 | Wang et al. | |
| 2019/0096238 A1 | 3/2019 | Ran et al. | |
| 2019/0132709 A1* | 5/2019 | Graefe | G08G 1/096716 |
| 2019/0225237 A1* | 7/2019 | Ishikawa | B60W 50/082 |
| 2019/0243371 A1* | 8/2019 | Nister | G05D 1/65 |

(Continued)

OTHER PUBLICATIONS

International Search Report and Written Opinion for PCT/US2022/024337, mailed Aug. 12, 2022, 16 pages.

(Continued)

*Primary Examiner* — Ashley L Redhead, Jr.
(74) *Attorney, Agent, or Firm* — Casimir Jones, S.C.; Thomas A. Isenbarger

(57) ABSTRACT

A Vehicle Intelligent Unit (VIU) is configured to provide vehicle operations and control for Connected Automated Vehicles (CAV) and, more particularly, to connect with a Collaborative Automated Driving System (CADS) and manage and/or control information exchange between CAV and CADS and manage and/or control CAV lateral and longitudinal movements, including vehicle following, lane changing, and route guidance.

18 Claims, 22 Drawing Sheets

(56) References Cited

U.S. PATENT DOCUMENTS

| | | |
|---|---|---|
| 2019/0244521 A1 | 8/2019 | Ran et al. |
| 2019/0324454 A1 | 10/2019 | Hansel et al. |
| 2019/0340921 A1 | 11/2019 | Ran et al. |
| 2020/0005633 A1 | 1/2020 | Jin et al. |
| 2020/0010077 A1 | 1/2020 | Cormack et al. |
| 2020/0021961 A1 | 1/2020 | Li et al. |
| 2020/0072966 A1 | 3/2020 | Fang et al. |
| 2020/0101981 A1 | 4/2020 | Phillips et al. |
| 2020/0150672 A1* | 5/2020 | Naghshvar ........... G05D 1/0257 |
| 2020/0168081 A1 | 5/2020 | Ran et al. |
| 2020/0342966 A1* | 10/2020 | Stern ...................... G06Q 30/04 |
| 2021/0065547 A1 | 3/2021 | Ran et al. |
| 2021/0078592 A1* | 3/2021 | Febbo .................... G06V 20/58 |
| 2021/0311491 A1 | 10/2021 | Li et al. |
| 2021/0314752 A1 | 10/2021 | Ran et al. |
| 2021/0383699 A1* | 12/2021 | Xiao ..................... B60W 30/06 |
| 2021/0394797 A1 | 12/2021 | Ran et al. |
| 2022/0126863 A1* | 4/2022 | Moustafa .............. B60W 50/14 |
| 2022/0126864 A1* | 4/2022 | Moustafa ......... G08G 1/096758 |
| 2022/0126878 A1* | 4/2022 | Moustafa ......... G08G 1/096741 |
| 2022/0204044 A1* | 6/2022 | Iida .................... B60W 50/023 |
| 2022/0219731 A1 | 7/2022 | Ran et al. |
| 2022/0227367 A1* | 7/2022 | Kario ................ B60W 30/0956 |
| 2022/0270476 A1 | 8/2022 | Ran et al. |
| 2022/0398851 A1* | 12/2022 | Nehmadi ................ G01S 17/87 |
| 2023/0023349 A1* | 1/2023 | Pathak .................. B60W 30/06 |
| 2023/0141127 A1* | 5/2023 | Yu ........................ G05D 1/0295 |
| | | 701/23 |
| 2023/0179969 A1* | 6/2023 | Pateromichelakis ....................... |
| | | H04L 41/0894 |
| | | 370/329 |

OTHER PUBLICATIONS

SAE International Standard J3016, "Taxonomy and Definitions for Terms Related to Driving Automation Systems for On-Road Motor Vehicles" 2014 (J3016_201401) 12 pages.

SAE International Standard J3016, "Taxonomy and Definitions for Terms Related to Driving Automation Systems for On-Road Motor Vehicles" 2018 (J3016_201806) 35 pages.

SAE International Standard J3016, "Taxonomy and Definitions for Terms Related to Driving Automation Systems for On-Road Motor Vehicles" 2016 (J3016_201609) 30 pages.

* cited by examiner

VEHICLE INTELLIGENT UNIT

This application claims priority to U.S. provisional patent application Ser. No. 63/175,158, filed Apr. 15, 2021, which is incorporated herein by reference in its entirety.

FIELD

Provided herein is technology relating to automated driving and particularly, but not exclusively, to a Vehicle Intelligent Unit (VIU) configured to provide vehicle operations and control for Connected Automated Vehicles (CAV) and, more particularly, to a VIU configured to connect with a Collaborative Automated Driving System (CADS) and manage and/or control information exchange between CAV and CADS and manage and/or control CAV lateral and longitudinal movements, including vehicle following, lane changing, and route guidance.

BACKGROUND

Connected and Automated Vehicles (CAV) that are capable of automated driving under certain conditions are in development. However, deployment of CAV has been limited by high costs (e.g., capital and/or energy costs) and technological complexities associated with the numerous sensors and computational devices provided on CAV, and by inadequate functional capabilities of CAV, e.g., for addressing long-tail complex driving scenarios.

SUMMARY

Recently, technologies have been developed to address some of these problems. For example, a Collaborative Automated Driving System (CADS) and/or components thereof is/are described in, e.g., U.S. Pat. App. Ser. No. 63/149,804, which is incorporated herein by reference. In some embodiments, the technology described herein relates to a CADS comprising 1) a cooperative management subsystem; 2) a road subsystem; 3) a vehicle subsystem; 4) a communication subsystem; 5) a user subsystem; and/or 6) a supporting subsystem. In particular, the technology provided herein relates to a Vehicle Intelligent Unit (VIU) that provides an interface with a CADS. In some embodiments, the vehicle subsystem of the CADS comprises a vehicle adapter and/or a VIU as described herein.

The VIU technology provided herein reduces the costs of CAV and increases the functional capabilities of CAV by providing an interface with a CADS and associated Connected Automated Highway (CAH) and Intelligent Road Infrastructure System (IRIS). In particular, the VIU is configured to be installed in a vehicle and provides an interface with a CADS to improve automated driving functions and intelligence level of the vehicle. By providing CADS services to a vehicle, the VIU significantly reduces the cost and burden of a Conventional Vehicle Control System (CVCS) and provides automated driving for vehicles at various intelligence levels or automation levels as defined by SAE.

In some embodiments, the VIU is configured to manage automated driving functions of a vehicle (e.g., a CAV). In some embodiments, the VIU provides an interface configured to exchange information between a vehicle and a CADS, between a vehicle and a CADS subsystem, and/or between a vehicle and road infrastructure (e.g., IRIS). In some embodiments, the VIU provides an interface between a vehicle and an IRIS that is an Intelligent Roadside Toolbox (IRT) (see, e.g., U.S. patent application Ser. No. 17/192,529, incorporated herein by reference). In some embodiments, the VIU provides an interface between a vehicle and an IRIS subsystem, e.g., a Roadside Intelligent Unit (RIU). In some embodiments, the VIU provides an interface between a vehicle and a user and/or between a vehicle and a supporting subsystem. In some embodiments, the VIU is configured to manage sensing, prediction, planning, and/or control functions for a vehicle. In some embodiments, the VIU is configured to manage sensing, prediction, planning, and/or control functions for a plurality of vehicles and the plurality of vehicles comprises vehicles having different intelligence levels, the plurality of vehicles comprises vehicles having different brands and/or manufacturers, the plurality of vehicles comprises vehicles having different model years, and/or the plurality of vehicles comprises different vehicle models.

In some embodiments, the VIU provides an interface configured to exchange information between a vehicle and an Automated Driving System (ADS) and/or components thereof, which is described in, e.g., U.S. Pat. App. Pub. Nos. 20190096238; 20190340921; 20190244521; 20200005633; 20200168081; and 20200021961; in U.S. Pat. App. Ser. Nos. 16/996,684; 63/004,551; and 63/004,564, and in U.S. Pat. Nos. 10,380,886; and 10,692,365, each of which is incorporated herein by reference. In some embodiments, ADS technologies provide systems, components of systems, methods, and related functionalities that overcome the limitations of current CAV technologies. In particular, some embodiments of ADS technologies comprise roadside infrastructure configured to provide roadside sensing, roadside prediction, roadside planning and/or decision making, and/or roadside control of CAV. These ADS technologies (e.g., systems, components of systems, methods, and related functionalities) provide automated driving, e.g., by providing support for CAV to perform automated driving tasks on a road.

In some embodiments, the VIU technology improves and/or extends particular ADS technologies, e.g., the Connected Automated Vehicle Highway (CAVH) technology and related technologies described in, e.g., U.S. Pat. App. Pub. Nos. 20190096238; 20190340921; 20190244521; 20200005633; 20200168081; and 20200021961; in U.S. Pat. App. Ser. Nos. 16/996,684; 63/004,551; and 63/004,564, and in U.S. Pat. Nos. 10,380,886; and 10,692,365, each of which is incorporated herein by reference. In particular, in some embodiments, the VIU provides an interface configured to exchange information between a vehicle and a CAVH system and/or a component of a CAVH system. Thus, the VIU technology described herein improves CAVH technologies (e.g., CAVH systems, components of CAVH systems, CAVH methods, and related CAVH functionalities) by enhancing the CAVH subsystem design scheme and adding further subsystems and algorithms to the CAVH technology.

In some embodiments, the VIU provides an interface configured to exchange information between a vehicle and a Distributed Driving Systems (DDS) technology and related technologies described in, e.g., U.S. Pat. App. Pub. No. 20210065547; and/or in U.S. Pat. App. Ser. No. 62/894,703. In particular, in some embodiments, the VIU technology provided herein provides an interface configured to exchange information between a vehicle and a distributed driving system (DDS) comprising an intelligent roadside toolbox (IRT) that provides modular access to CAVH and IRIS technologies (e.g., services) according to the automated driving needs of a particular vehicle.

Moreover, embodiments of the VIU technology improve and/or extend previous ADS and CAVH technologies and related technologies that are described in, e.g., U.S. patent application Ser. No. 16/505,034, each of which is incorporated herein by reference. Accordingly, in some embodiments, the VIU technology provided herein relates to a vehicle control On-Board Unit (OBU) configured to exchange data with a vehicle-road infrastructure coordination transportation system. In some embodiments, the vehicle control OBU is configured to exchange data with a CAVH and/or an IRIS.

In some embodiments, the technology provides a Conventional Vehicle Control System (CVCS). The CVCS is a vehicle control and actuator system and functions as a "brain" for executing automated driving functions for an autonomous vehicle. In some embodiments, the CVCS is provided for vehicles of different intelligence levels and provides a number of technologies that operate vehicles safely in manual and/or automatic driving modes. These technologies include sensing (e.g., camera, radar, lidar), surveillance, global positioning (e.g., using a global navigation satellite system radio), computing, artificial intelligence, and wireless and wireline communication (e.g., onboard mobile internet, inter-vehicle communication network, in-vehicle communication network).

In some embodiments, a vehicle comprising a CVCS has an intelligence level or automation level V as defined by SAE. In some embodiments, the CVCS is provided by an automaker, an Original Equipment Manufacturer (OEM), or a technology company. In some embodiments, the CVCS provides technology for a vehicle to drive at an intelligence level V independently. However, in some embodiments, when a vehicle cannot or cannot sufficiently drive at an intelligence level V due to its own system issues, technological limitations, or challenges of the driving environment, the CADS with an intelligence level S and associated IRIS with an intelligence level I provide automated driving functions and capabilities to the vehicle through the CVCS and/or VIU interface so that the vehicle can perform automated driving tasks sufficiently for the driving environment. Accordingly, the technology allows the vehicle to conduct automated driving at an intelligence level which is at least at level V or higher and, consequently, satisfies user requirements for automated driving.

In general, the intelligence level S is equal to or greater than the intelligence level V. Accordingly, the VIU is configured to be installed in a vehicle to provide an interface for the CADS and/or IRIS to provide automated driving functions to a vehicle and, in some embodiments, to increase the intelligence level of the vehicle. Technologies for improving vehicle intelligence level V by allocating driving intelligence between a vehicle and infrastructure are described in, e.g., U.S. patent application Ser. No. 16/406,621, which is incorporated herein by reference. Specifically, U.S. patent application Ser. No. 16/406,621 describes and/or defines five intelligence levels S (S1-S5) of the CADS and/or CAVH and five intelligence levels I (I1-I5) of the IRIS. In some embodiments, the technology provided herein relates to CADS and CAVH system intelligence and system intelligence levels and to systems and methods that allocate, arrange, and/or distribute driving intelligence and functions for CADS and CAVH systems based on two dimensions: the vehicle intelligence V and infrastructure intelligence I. Accordingly, the technology provides that a vehicle comprising a VIU (e.g., the VIU is installed in the vehicle) performs automated driving at an intelligence level S with the help of the CADS (e.g., CAVH) and the IRIS.

As described herein, the technology provides a VIU designed to support automated driving functions, e.g., to complement, enhance, backup, elevate, and/or replace vehicle automated driving tasks (e.g., as described further herein). Specifically, in some embodiments, the VIU provides complement, enhancement, and backup functions for vehicle sensing, decision-making, and control functions of the CVCS. In some embodiments, the VIU elevates the intelligence level or the automation level defined by SAE. In some embodiments, e.g., in case of an emergency, the VIU functions partially or completely replace the CVCS functions to provide automated driving functions.

In some embodiments, the VIU complements vehicle sensing, decision-making, and/or control functions of the CVCS to complete vehicle sensing, decision-making, and/or control functions provided by the CVCS.

In some embodiments, the VIU improves the automated driving functions of a vehicle (e.g., sensing, prediction, planning, and control) provided by the CVCS.

In some embodiments, the VIU provides a backup of functionality of the CVCS, e.g., in case of failure of the CVCS and/or of a component of the CVCS.

In some embodiments, the VIU elevates a vehicle intelligence level (e.g., as defined by SAE) from a lower intelligence level to a higher intelligence level.

In some embodiments, the VIU partially or completely replaces the CVCS to provide partial or complete automated driving functions for a vehicle.

Accordingly, in some embodiments, the technology provides a VIU comprising one or more of an onboard sensor access and information processing module; a communication module; an information conversion module; a sensing and perception fusion module; a collaborative decision-making module; a high-precision map and location identification module; an intelligent control instruction/auxiliary module; a redundancy verification module; a human-computer interaction module; and/or a supporting module. In some embodiments, the VIU is configured to be installed in a vehicle and provide the vehicle with partial or full automated driving functions.

In some embodiments, the onboard sensor access and information processing module receives information collected by onboard sensors, processes the information collected by onboard sensors, and/or replaces the information processing function of a Conventional Vehicle Control System (CVCS). In some embodiments, the onboard sensor access and information processing module replaces the information processing function of a CVCS when the CVCS fails, is non-functioning, and/or is malfunctioning.

In some embodiments, the communication module manages information exchange between the onboard system and external systems, manages information exchange between the VIU and the CVCS, and manages communication between the VIU subsystems and/or VIU modules. In some embodiments, the information conversion module manages information exchange between the onboard system and external systems. In some embodiments, the information conversion module comprises a codebook and communication protocol. In some embodiments, the information conversion module manages communication among entities having different data format standards and/or communication protocols. In some embodiments, the information conversion module manages communication among a vehicle comprising the VIU, one or more vehicles, an Intelligent Roadside Information System (IRIS), and/or a Cooperative Management (CM) subsystem of a Cooperative Automated Driving System (CADS).

In some embodiments, the sensing and perception fusion module fuses the sensing and perception information provided by the vehicle subsystem and the sensing and perception information provided by external systems to provide fused sensing and perception information. In some embodiments, the sensing and perception fusion module outputs the fused sensing and perception information and/or self-cognition and environment sensing information to the collaborative decision-making module.

In some embodiments, the collaborative decision-making module receives fused sensing and perception information and uses the fused sensing and perception information for decision making, path planning, security identification, and/or generating vehicle control instructions.

In some embodiments, the high-precision map and location identification module provides a high-precision map provided by the CADS to the VIU. In some embodiments, the high-precision map and location identification module provides location identification using a high-precision map, satellite navigation and satellite network, internet-of-things devices, and/or geo-tags.

In some embodiments, the intelligent control instruction/auxiliary module coordinates vehicle control outputs produced by the CVCS and vehicle control outputs produced by the VIU to produce comprehensive control instructions for controlling a vehicle. In some embodiments, vehicle control outputs (e.g., integrated vehicle control instructions and/or comprehensive vehicle control instructions) produced by the VIU are produced by the VIU decision-making module. In some embodiments, the intelligent control instruction/auxiliary module coordinates vehicle control outputs that are control instructions provided by onboard systems and/or control instructions provided by an external system. In some embodiments, the redundancy verification module verifies control instructions to improve and/or maximize the safety of the vehicle.

In some embodiments, the human-computer interaction module receives inputs from drivers to outputs information describing the external environment of a vehicle and vehicle working status. In some embodiments, the inputs comprise destination information, driving requirements, and/or control instructions. In some embodiments, the human-computer interaction module prompts a driver to assume control of a vehicle.

In some embodiments, the supporting module provides power supply to VIU subsystems and/or modules and maintains system security.

In some embodiments, the VIU comprises a combination of a number of modules and said combination provides partial or complete automated driving functions according to the CVCS and driving task requirements.

In some embodiments, the VIU is installed in a vehicle and said VIU is configured to be a subsystem of a CADS. In some embodiments, the VIU implements CADS functions for the vehicle and executes CADS functions for the vehicle. In some embodiments, the vehicle performs automated driving tasks at intelligence level 1, 2, 3, 4, and/or 5.

In some embodiments, the information conversion module manages information exchange between the CADS and the vehicle.

In some embodiments, the CADS receives and processes sensor data describing the vehicle and the driving environment of the vehicle and the CADS provides vehicle control instructions for the vehicle.

In some embodiments, the VIU is configured to enable vehicles with an intelligence level of 1, 2, 3, 4, or 5 to cooperate with an IRIS having an intelligence level of 1, 2, 3, 4, or 5 to provide a CADS having an intelligence level of 1, 2, 3, 4, or 5.

In some embodiments, the VIU is configured to facilitate the execution of collaborative automated driving tasks for a plurality of vehicles, wherein the plurality of vehicles comprises vehicle having different intelligence levels, different brands and/or manufacturers, different model years, different vehicle models, and/or different platforms.

In some embodiments, the communication module provides wired and wireless communication. In some embodiments, the communication module provides information sharing and information exchange among a vehicle comprising the VIU, a cooperative management system of a CADS, as IRIS or as IRIS subsystem, and other vehicles. In some embodiments, the IRIS subsystem is a Roadside Intelligent Unit (RIU) or an Intelligent Roadside Toolbox (IRT). In some embodiments, the communication module communicates using 4G, 5G, 6G, or 7G cellular; dedicated short-range communication (DSRC); and/or C-V2X technology. In some embodiments, the communication module communicates through the information conversion module to exchange information with the cooperative management system of a CADS, an IRIS or an IRIS subsystem, and/or other vehicles. In some embodiments, the IRIS subsystem is an RIU or an IRT.

In some embodiments, the VIU communicates with the cooperative management system of a CADS, an IRIS or an IRIS subsystem, and/or other vehicles to provide communications for automated driving tasks. In some embodiments, the information conversion module provides an information coding function to encode automated driving task data and information using a code book. In some embodiments, the information conversion module provides an information exchange function to transmit driving demands, driving information, vehicle environment information, and/or real-time status of automated driving to the cooperative management system of the CADS; and to receive data and information from other modules for sensing data fusion and collaborative decision-making by the VIU.

In some embodiments, the sensing and perception fusion module receives sensing data and information from vehicles and external systems; performs data fusion on the sensing data and information; and provides perception functions. In some embodiments, the sensing data and information from vehicles and external systems comprises high-definition (HD) map information; traffic information; driving information from surrounding vehicles; route planning information; and/or driving decision instructions. In some embodiments, the sensing and perception fusion module obtains resources from external systems to provide an enhanced perception function for a vehicle. In some embodiments, the enhanced perception function supports longitudinal and/or lateral trajectory planning and control for a vehicle of intelligence level 1. In some embodiments, the sensing and perception fusion module sends information to a CADS and/or obtains resources from the CADS to provide a supplemental perception function for a vehicle. In some embodiments, the sensing and perception fusion module sends information to the collaborative decision-making module of said VIU. In some embodiments, the supplemental perception function is provided to a vehicle having intelligence level 2. In some embodiments, the sensing and perception fusion module facilitates the operations of a vehicle of intelligence level 3 to override a driving decision of a human driver. In some embodiments, the sensing and perception fusion module obtains resource from the CADS and provides extra perception and monitoring of the driver in real-time. In some embodiments, the sensing and perception fusion module sends information to the collaborative decision-making module of the VIU; provides perception results to the VIU; and determines whether the VIU should override the driving decision of the human driver using perception results. In some embodiments, the sensing and perception fusion module supports the operations of a vehicle of intelligence level 4 in long-tail scenarios by obtaining resources from the CADS and providing perception information to solve the long-tail Operational Design Domain (ODD) risks. In some embodiments, the sensing and perception fusion module supports the operations of a vehicle of intelligence level 5 by providing improved dynamic HD maps, a wider range of environmental sensing, route planning information, driving decisions, and improved perception. In some embodiments, the VIU reduces the research and development time and cost of a vehicle of intelligence level 5.

In some embodiments, the collaborative decision-making module collaborates with the CADS to generate fusion results and collaborative decision-making instructions. In some embodiments, the CADS provides external perception, decision-making, and vehicle control information and functions. In some embodiments, the collaborative decision-making module generates decisions that support longitudinal and/or lateral vehicle control to provide partial automated driving for a vehicle of intelligence level I. In some embodiments, the collaborative decision-making module provides trajectory planning decisions and detailed driving decisions; and transmits driver override decisions using information from a vehicle of intelligence level 2. In some embodiments, the collaborative decision-making module collaborates with external systems to generate decisions for a vehicle of intelligence level 3. In some embodiments, the decisions override driving decisions of a human driver. In some embodiments, the VIU responds to a request of the vehicle CVCS to override a human driver and generates vehicle control instructions. In some embodiments, the CVCS uses fusion perception results to make a decision to request override of a human driver. In some embodiments, the VIU determines that it cannot override the decisions of a human driver and prompts the driver to assume control of a vehicle, the VIU monitors the status and/or driving of the human driver, the VIU responds to an emergency, and/or the VIU provides vehicle control to assist a human driver. In some embodiments, the collaborative decision-making module generates decisions in collaboration with the external systems to address long-tail scenarios for a vehicle of intelligence level 4. In some embodiments, the collaborative decision-making module receives resources from CADS to increase the safety of driving decisions. In some embodiments, the collaborative decision-making module receives resources from CADS to reduce the long-tail risks and extend the Operational Design Domain (ODD). In some embodiments, the collaborative decision-making module improves predictive decisions and trajectory planning based on perception results for a vehicle of intelligence level 5.

In some embodiments, the intelligent control instruction/auxiliary module is configured to fuse the VIU decision instructions and the CVCS decision instructions. In some embodiments, the VIU is configured to extend partial or full CADS automated driving functions to a vehicle equipped with the VIU by executing CADS instructions. In some embodiments, the VIU is configured to provide road and traffic information to a vehicle equipped with the VIU. In some embodiments, the VIU is configured to provide positioning and navigation requirements to a system map of CADS when the VIU transmits origin and destination information to CADS. In some embodiments, the VIU is configured to transmit sensing information to CADS and share sensing information with CADS when a vehicle equipped with the VIU connects to the CADS. In some embodiments, sensing information is shared by CADS with users of the CADS. In some embodiments, the users of the CADS include cloud platforms, IRIS, an IRIS subsystem, roadside infrastructure, communication devices, or vehicles equipped with a VIU and connected to the CADS.

In some embodiments, the VIU is configured to complement, enhance, backup, elevate, and/or replace automated driving functions of the CVCS of a vehicle. In some embodiments, the VIU collaborates with a vehicle CVCS to complement, enhance, backup, elevate, and/or replace the automated driving functions of the CVCS of said vehicle. In some embodiments, VIU is configured to complement, enhance, backup, elevate, and/or replace automated driving functions of vehicles having an intelligence level of 1, 2, 3, 4, or 5 and driving on roadways with intelligence levels of 0, 1, 2, 3, 4, or 5. In some embodiments, the VIU is configured to complement the automated driving functions of a CVCS to provide automated driving for vehicles in long-tail scenarios including incidents; events; construction and/or work zones; extreme and/or adverse weather; hazardous roads; unclear road markings, signs, and/or geometric designs; and/or high concentrations of pedestrians and/or bicycles.

In some embodiments, the sensing and perception fusion module and the collaborative decision-making module of the VIU complement the automated driving functions of the CVCS with sensing information, decision-making, and vehicle control instructions provided by the CADS, a CADS subsystem, IRIS, an RIU, an IRT, and/or roadside infrastructure. In some embodiments, the VIU is configured to perform a method for enhancing the sensing, prediction, planning, and control functions of a CVCS, said method comprising: fusing, by the fusion module of the VIU, sensing data and information to enhance the sensing and prediction ability of the CVCS; collaborating, by the collaborative decision-making module of the VIU, with CADS to enhance the planning ability of the CVCS; and fusing, by the intelligent control instruction/auxiliary module of the VIU, instructions from the VIU and the CVCS to generate integrated control instructions, to enhance the control ability of the CVCS.

In some embodiments, the redundancy verification module eliminates and/or minimizes errors and resolves contradictions of information processing and transmission. In some embodiments, the redundancy verification module eliminates and/or minimizes errors, resolves contradictions, and/or verifies sensing information, decision-making, and control instructions provided by a vehicle onboard system and by external systems; driving decisions generated by the CVCS; and/or driving decisions generated by the VIU. In some embodiments, the VIU is configured to collaborate with a vehicle CVCS to provide automated driving for a vehicle, wherein the CVCS generates driving decisions and control instructions; the VIU generates driving decisions and control instructions; and the VIU fuses driving decisions and/or control instructions from the CVCS and VIU. In some embodiments, the VIU further provides a redundant onboard unit for a vehicle to provide stable automated driving functions for a vehicle. In some embodiments, the CVCS generates driving decisions and control instructions to respond to unexpected traffic conditions.

In some embodiments, the VIU generates driving decisions and control instructions in collaboration with the CADS or its subsystems, an IRIS, a RIU, an IRT, and/or roadside infrastructure.

In some embodiments, wherein when a module in the CVCS fails or malfunctions, a corresponding module in the VIU system substitutes for the failed module in the CVCS. In some embodiments, the VIU is configured to elevate a vehicle intelligence level by enhancing the automated driving functions of said vehicle using the VIU sensing and perception fusion module and collaborative decision-making module.

In some embodiments, the VIU elevates the intelligence level of a vehicle having intelligence level 1 to intelligence level 2, 3, 4, or 5.

In some embodiments, the VIU elevates the intelligence level of a vehicle having intelligence level 2 to intelligence level 3, 4, or 5.

In some embodiments, the VIU elevates the intelligence level of a vehicle having intelligence level 3 to intelligence level 4 or 5.

In some embodiments, the VIU elevates the intelligence level of a vehicle having intelligence level 4 to intelligence level 5.

In some embodiments, the VIU improves the safety level of a vehicle having intelligence level and/or reduces the cost of the vehicle.

In some embodiments, the VIU is configured to replace partial or full automated driving tasks of a CVCS when the CVCS fails or malfunctions. In some embodiments, the vehicle information access and processing module generates and sends sensing information to the sensing and perception fusion module. In some embodiments, the communication module and the information conversion module receive and send external information to the sensing and perception fusion module. In some embodiments, the sensing and perception fusion module generates and sends fusion sensing results to the collaborative decision-making module. In some embodiments, the collaborative decision-making module generates and sends decision-making instructions to the intelligent control instruction/auxiliary module to generate comprehensive control instructions for vehicle driving tasks.

In some embodiments, the VIU configured to form parallel, sequential, and crossover architectural relationships with the CVCS for information processing. In some embodiments, information processing comprises sensing fusion, intelligent decision-making, and comprehensive vehicle control. In some embodiments, forming parallel, sequential, and crossover architectural relationships with the CVCS for information processing comprises integrating and/or fusing functional modules of VIU and CVCS. In some embodiments, the VIU and CVCS share information, data, and/or resources to provide VIU complement, enhancement, backup, elevation, and replacement functions.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
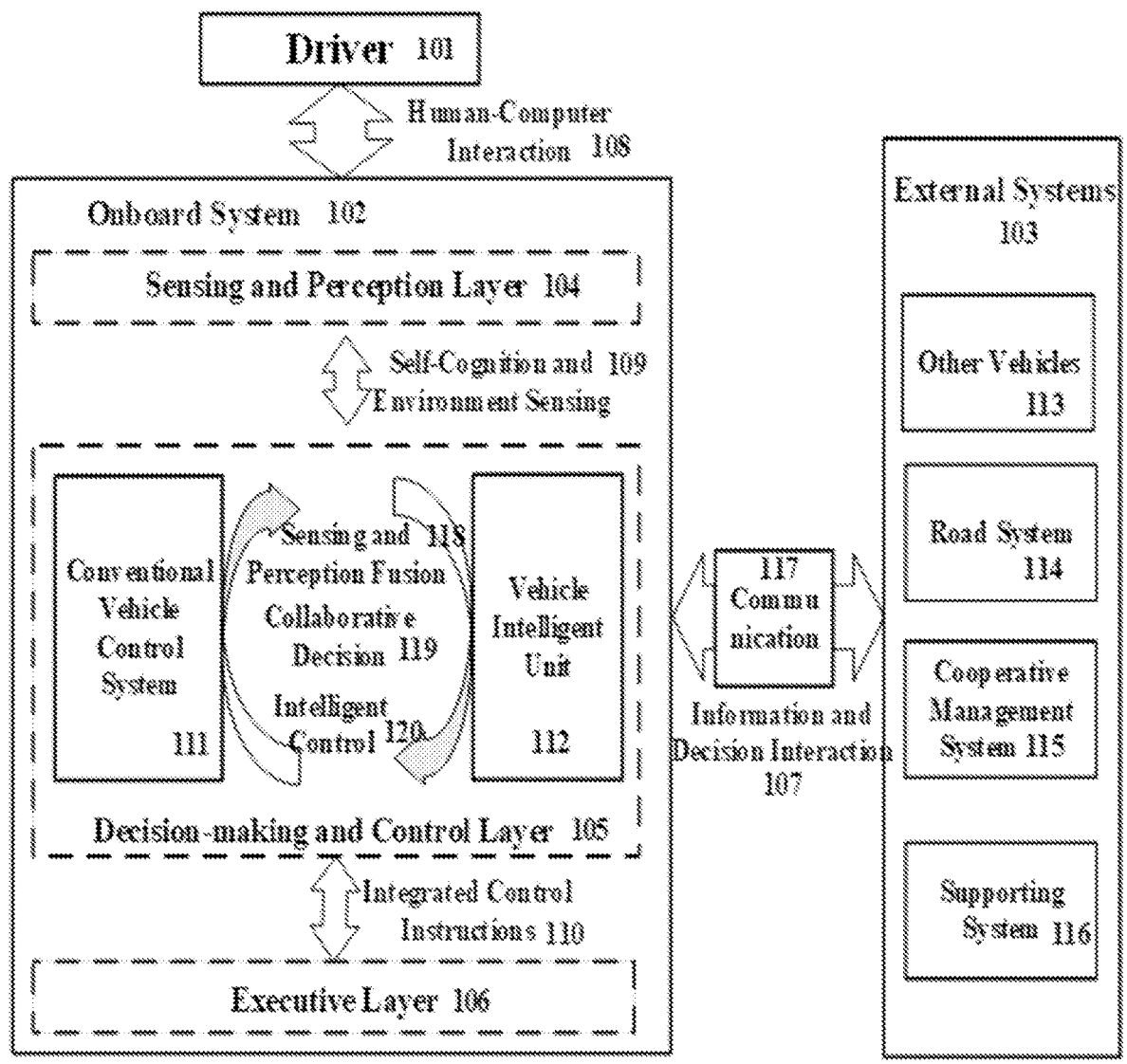
FIG. 1 is schematic drawing showing an overview of the functional architecture of the collaborative automated driving system (CADS) comprising a CAV and wherein the CAV comprises a VIU (112). 101: Driver; 102: Onboard System; 103: External Systems; 104: Sensing and Perception Layer; 105: Decision-making and Control Layer; 106: Executive Layer; 107: Information and Decision Interaction; 108: Human-Computer Interaction; 109: Self-Cognition and Environment Sensing; 110: Integrated Control Instructions; 111: Conventional Vehicle Control System; 112: Vehicle Intelligent Unit; 113: Other Vehicles; 114: Road System; 115: Cooperative Management System; 116: Supporting System; 117: Communication; 118: Sensing and Perception Fusion; 119: Collaborative Decision; 120: Intelligent Control.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to automated driving and particularly, but not exclusively, to a Vehicle Intelligent Unit (VIU) configured to help Connected Automated Vehicles (CAV) conduct full vehicle operations and control and, more particularly, to a VIU configured to connect with a Collaborative Automated Driving System (CADS) and help a CAV manage and/or control its lateral and longitudinal movements, including vehicle following, lane changing, route guidance, and related information. The VIU is designed to be installed in vehicles that are able to perform some or all automated driving functions and/or to improve the level of automated driving intelligence for the vehicle. In some embodiments, the VIU provides an interface that allows the vehicle to access and/or interact with one or more Collaborative Automated Driving Systems (CADS) that comprise, e.g., passengers and drivers, Connected Automated Vehicles (CAV), Connected Automated Highway (CAH), communication systems, cooperative management subsystems, and/or supporting subsystems. In some embodiments, the VIU works with a Conventional Vehicle Control System (CVCS) of the vehicle to execute some or all of the automated driving tasks. In some embodiments, the VIU provides complement, enhancement, backup, elevation, and replacement functions that provide automated driving tasks for a vehicle and thus allow the vehicle to perform automated driving tasks.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present" or "absent") is used in a relative sense to describe the amount or level of a particular entity (e.g., component, action, element). For example, when an entity is said to be "present", it means the level or amount of this entity is above a pre-determined threshold; conversely, when an entity is said to be "absent", it means the level or amount of this entity is below a pre-determined threshold. The pre-determined threshold may be the threshold for detectability associated with the particular test used to detect the entity or any other threshold. When an entity is "detected" it is "present"; when an entity is "not detected" it is "absent".

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, the term "number" shall mean one or an integer greater than one (e.g., a plurality).

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods. For example, a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform a function of the system or subsystem. Thus, the methods and apparatus of the embodiments, or certain aspects or portions thereof, may take the form of program code (e.g., instructions) embodied in tangible media, such as floppy diskettes, CD-ROMs, hard drives, flash memory, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (e.g., volatile and non-volatile memory and/or storage elements), at least one input device, and at least one output device. One or more programs may implement or utilize the processes described in connection with the embodiments, e.g., through the use of an application programming interface (API), reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and combined with hardware implementations.

As used herein, the term "long-tail" scenario, event, environment, etc. refers to a scenario, event, environment, etc. that occurs at a low frequency and/or a scenario, event, environment, etc. that is predicted to occur with a low probability. Exemplary long-tail scenarios, events, and/or environments include, but are not limited to, vehicle accidents; special events (e.g., sports events, hazard evacuation, etc.); construction and/or work zones; extreme and/or adverse weather (e.g., snowstorm, icy road, heavy rain, etc.); hazardous roads (e g animals on roads, rough roads, gravel, bumpy edges, uneven expansion joints, slick surfaces, standing water, debris, uphill grade, downhill grade, sharp turns, no guardrails, narrow road, narrow bridge, etc.); unclear road markings, unclear signing, and/or unclear geometric designs; high density of pedestrians and/or bicycles.

As used herein, the term "automated driving system" (abbreviated "ADS") refers to a system that performs driving tasks (e.g. lateral and longitudinal control of the vehicle) for a vehicle and thus allows a vehicle to drive with reduced human control of driving tasks and/or without human control of driving tasks.

As used herein, the term "Collaborative Automated Driving System" (abbreviated "CADS") refers to an automated driving system that performs driving tasks (e.g., lateral and/or longitudinal control) for a vehicle with full or partial collaboration of the vehicle and the roadway infrastructure (e.g., an IRIS). A CADS thus allows a vehicle to drive with reduced human control of driving tasks and/or without human control of driving tasks. See U.S. Pat. App. Ser. No. 63/149,804, which is incorporated herein by reference.

As used herein, the term "integrated control instructions" refers to vehicle control instructions produced by a collaborative process between a vehicle and a CADS and/or a CADS component. In some embodiments, the term "integrated control instructions" refers to vehicle control instructions produced by a collaborative process between a VIU and a CVCS in which control instructions produced by the VIU and control instructions produced by the CVCS are fused and/or verified to produce the integrated control instructions that are used to provide vehicle control, e.g., by an actuator.

As used herein, the term Operational Design Domain (abbreviated ODD) refers to the operating conditions under which a given automated driving system and/or feature thereof is specifically designed to function, including, but not limited to, characteristics and/or restrictions related to environmental, geographical, and/or time-of-day factors, and/or related to the presence or absence of certain traffic or roadway characteristics. In some embodiments, the ODD is defined by SAE International Standard J3016, "Taxonomy and Definitions for Terms Related to Driving Automation Systems for On-Road Motor Vehicles" (J3016_201806), which is incorporated herein by reference.

As used herein, the term "Connected Automated Vehicle Highway System" ("CAVH System") refers to a comprehensive system (e.g., an ADS or a CADS) providing full vehicle operations and control for connected and automated vehicles (CAV), and, more particularly, to a system controlling CAV by sending individual vehicles with detailed and time-sensitive control instructions for vehicle following, lane changing, route guidance, and related information. A CAVH system comprises sensing, communication, and control components connected through segments and nodes that manage an entire transportation system. CAVH systems comprise four control levels: vehicle; roadside unit (RSU), which, in some embodiments, is similar to or the same as a roadside intelligent unit (RIU); traffic control unit (TCU); and traffic control center (TCC). See U.S. Pat. Nos. 10,380,886; 10,867,512; and/or 10,692,365, each of which is incorporated herein by reference.

As used herein, the term "Intelligent Road Infrastructure System" ("IRIS") refers to a system that facilitates vehicle operations and control for CAVH systems. See U.S. Pat. No. 10,867,512 and/or 10,692,365, each of which is incorporated herein by reference. In some embodiments, an IRIS provides transportation management and operations and individual vehicle control for connected and automated vehicles (CAV). For example, in some embodiments, an IRIS provides a system for controlling CAV by sending individual vehicles with customized, detailed, and time-sensitive control instructions and traffic information for automated vehicle driving, such as vehicle following, lane changing, route guidance, and/or other related information.

As used herein, the term "Intelligent Roadside Toolbox" ("IRT") refers to a system that facilitates vehicle operations and control for a distributed driving system (DDS), which is a type of IRIS technology. In some embodiments, the IRT provides modular access to CAVH and IRIS technologies (e.g., services) according to the automated driving needs of a particular vehicle. See U.S. patent application Ser. Nos. 17/192,529 and 16/996,684, each of which is incorporated herein by reference. In some embodiments, the IRT provides vehicles with individually customized information and real-time control instructions for the vehicle to perform driving tasks, e.g., vehicle following, lane changing, and/or route guidance.

As used herein, the term "GPS" refers to a global navigation satellite system (GNSS) that provides geolocation and time information to a receiver. Examples of a GNSS include, but are not limited to, the Global Positioning System developed by the United States, Differential Global Positioning System (DGPS), BeiDou Navigation Satellite System (BDS) System, GLONASS Global Navigation Satellite System), European Union Galileo positioning system, the NavIC system of India, and the Quasi-Zenith Satellite System (QZSS) of Japan.

As used herein, the term "vehicle" refers to any type of powered transportation device, which includes, and is not limited to, an automobile, truck, bus, motorcycle, or boat. The vehicle may normally be controlled by an operator or may be unmanned and remotely or autonomously operated in another fashion, such as using controls other than the steering wheel, gear shift, brake pedal, and accelerator pedal.

As used herein, the term "automated vehicle" (abbreviated as "AV") refers to an automated vehicle in an automated mode, e.g., at any level of automation (e.g., as defined by SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806), each of which is incorporated herein by reference)).

As used herein, the term "road system" refers to roads and to road infrastructure, e.g., intelligent road infrastructure (e.g., IRIS, IRT, RIU/RSU), road signs, road markings, traffic control devices (e.g., traffic signal controller); and/or conventional traffic operations centers.

As used herein, the term "external system" refers to a CADS and/or any component or part of a CADS (e.g., a CAVH system) that is separate from and/or outside of a particular vehicle (e.g., a vehicle comprising a VIU) being referenced. Some exemplary external systems include, e.g., other vehicles, road systems, CMS, supporting system (e.g., power and security systems), cloud, edge computing device, map, and/or location identification devices (e.g., reference markers, DGPS base stations).

As used herein, the term "actuator" refers to a component of a vehicle that moves or controls a mechanical component of the vehicle in response to an electrical or logical (e.g., digital) signal. For example, an actuator may receive a control signal and produce a mechanical motion of a vehicle component that causes an acceleration of the vehicle, a deceleration of the vehicle, braking of the vehicle, and/or a steering and/or turning of the vehicle. An actuator may act upon a switch to activate and/or deactivate an electric and/or electronic component. For example, an actuator may receive a control signal and activate a switch to cause a turn signal to blink.

As used herein, the term "allocate", "allocating", and similar terms referring to resource distribution also include distributing, arranging, providing, managing, assigning, controlling, and/or coordinating resources.

As used herein, the term "resource" refers to computational capacity (e.g., computational power, computational cycles, etc.); memory and/or data storage capacity; sensing capacity; communications capacity (e.g., bandwidth, signal strength, signal fidelity, etc.); and/or electrical power.

As used herein, the term "service" refers to a process, a function that performs a process, and/or to a component or module that is configured to provide a function that performs a process.

As used herein, the term "adapter" refers to an interface connecting two components, systems, subsystems, modules, etc. In some embodiments, an adapter provides communications between the two components, systems, subsystems, modules (e.g., for exchange of data, instructions, and/or information between the two components, systems, subsystems, modules). In some embodiments, an adapter provides a translation service for conversion of a first data format output by a first component, system, subsystem, or module into a second data format output for use by a second component, system, subsystem, or module. In some embodiments, an "adapter" defines the types of requests that can be made; the types of responses to requests that can be made; how requests and responses to requests are made; the data formats that are used for requests, responses to requests, and data exchange; and/or other conventions defining the interaction of two components, systems, subsystems, modules, etc.

As used herein, the term "connected vehicle" or "CV" refers to a connected vehicle, e.g., configured for any level of communication (e.g., V2V, V2I, and/or I2V).

As used herein, the term "connected and autonomous vehicle" or "CAV" refers to an autonomous vehicle that is able to communicate with other vehicles (e.g., by V2V communication), with roadside intelligent units (RIU), traffic control signals, and/or other infrastructure (e.g., an ADS or component thereof) or devices. That is, the term "connected autonomous vehicle" or "CAV" refers to a connected autonomous vehicle having any level of automation (e.g., as defined by SAE International Standard J3016 (2014)) and communication (e.g., V2V, V2I, and/or I2V).

As used herein, the term "data fusion" refers to integrating a plurality of data sources to provide information (e.g., fused data) that is more consistent, accurate, and useful than any individual data source of the plurality of data sources.

As used herein, the term "configured" refers to a component, module, system, subsystem, etc. (e.g., hardware and/or software) that is constructed and/or programmed to carry out the indicated function.

As used herein, the terms "determine," "calculate," "compute," and variations thereof, are used interchangeably to any type of methodology, processes, mathematical operation, or technique.

As used herein, the term "sensing" refers to the function and/or capability of a sensor (e.g., a sensing device provided on a vehicle or road infrastructure) to detect and measure the status of a vehicle and/or the driving environment, e.g., to provide "sensing data". For example, vehicle sensors detect and measure the status (e.g., location, speed, acceleration, deceleration, and angular movement) of a vehicle and the driving environment (e.g., vehicle surroundings, surrounding and near-by objects such as vehicles, pedestrians, bicycles, obstacles, road signs and markings, etc.) Vehicle sensors may be provided in different parts of a vehicle.

As used herein, the term "perception" refers to using sensors and/or sensing data to continuously scan and monitor the driving environment, similar to a human collecting information using vision and other senses and integrating the information into a dynamic description of the human's environment. In some embodiments, "perception" includes technologies comprising computer vision and/or artificial intelligence to help vehicles sense and perceive their environment. In some embodiments, a perception module provides perception functions. In some embodiments, a perception module is installed in a vehicle or on roadside infrastructure (e.g., an RSU, RIU).

As used herein, the term "reliability" refers to a measure (e.g., a statistical measure) of the performance of a system without failure and/or error. In some embodiments, reliability is a measure of the length of time and/or number of functional cycles a system performs without a failure and/or error.

As used herein, the term "support" when used in reference to one or more components of an ADS, CADS, CAVH, CAV, and/or a vehicle providing support to and/or supporting one or more other components of the ADS, CADS, CAVH, CAV, and/or a vehicle refers to, e.g., exchange of information and/or data between components and/or levels of the ADS, CADS, CAVH, CAV, and/or a vehicle; sending and/or receiving instructions between components and/or levels of the ADS, CADS, CAVH, CAV, and/or a vehicle; and/or other interaction between components and/or levels of the ADS, CADS, CAVH, CAV, and/or a vehicle that provide functions such as information exchange, data transfer, messaging, and/or alerting.

As used herein, the term "CADS component" or "component of a CADS" refers individually and/or collectively to one or more of components of a CADS and/or a CAVH system, e.g., a VIU, RIU, TCC, TCU, TCC/TCU, TOC, CAV, a supporting subsystem, and/or a cloud component.

As used herein, the term "roadside intelligent unit" (abbreviated "RIU") may refer to one RIU, a plurality of RIU, and/or a network of RIU.

As used herein, the term "critical point" refers to a portion or region of a road that is identified as appropriate to be provided embodiments of the function allocation technology provided herein. In some embodiments, a critical point is categorized as a "static critical point" and in some embodiments, a critical point is categorized as a "dynamic critical point". As used herein, a "static critical point" is a point (e.g., region or location) of a road that is a critical point based on identification of road and/or traffic conditions that are generally constant or that change very slowly (e.g., on a time scale longer than a day, a week, or a month) or only by planned reconstruction of infrastructure. As used herein, a "dynamic critical point" is a point (e.g., region or location) of a road that is a critical point based on identification of road conditions that change (e.g., predictably or not predictably) with time (e.g., on a time scale of an hour, a day, a week, or a month). Critical points based on historical crash data, traffic signs, traffic signals, traffic capacity, and road geometry are exemplary static critical points. Critical points based on traffic oscillations, real-time traffic management, or real-time traffic incidents are exemplary dynamic critical points.

In some embodiments, critical points are identified using, e.g., historical crash data (e.g., the top 20% (e.g., top 15-25% (e.g., top 15, 16, 17, 18, 19, 20, 21, 22, 23, 24, or 25%)) most frequent crash points in a road system are identified as critical points); traffic signs (e.g., where certain traffic signs (e.g., accident-prone areas) are detected are identified as critical points); traffic capacity (e.g., the top 20% (e.g., top 15-25% (e.g., top 15, 16, 17, 18, 19, 20, 21, 22, 23, 24, or 25%)) highest traffic capacity areas are identified as critical points); road geometry (e.g., roads with critical road geometry (e.g., curves, blind spots, hills, intersections (e.g., signalized intersections, stop sign intersections, yield sign intersections), roundabouts) are identified as critical points); traffic oscillation (e.g., points with significant traffic oscillations are identified as critical points); real-time traffic management (e.g., points with potential traffic management are identified as critical points); and/or real-time traffic incident (e.g., points with traffic incidents (e.g., accident, crash, congestion, construction or maintenance, weather-related event, etc.) or vehicle malfunction are identified as critical points).

As used herein, the terms "microscopic", "mesoscopic", and "macroscopic" refer to relative scales in time and space. In some embodiments, the scales include, but are not limited to, a microscopic level relating to individual vehicles (e.g., longitudinal movements (car following, acceleration and deceleration, stopping and standing) and lateral movements (lane keeping, lane changing)), a mesoscopic level relating to road corridors and/or segments (e.g., special event early notification, incident prediction, merging and diverging, platoon splitting and integrating, variable speed limit prediction and reaction, segment travel time prediction, and/or segment traffic flow prediction), and a macroscopic level relating to an entire road network (e.g., prediction of potential congestion, prediction of potential incidents, prediction of network traffic demand, prediction of network status, prediction of network travel time). In some embodiments, a time scale at a microscopic level is from 1 to 10 milliseconds and is relevant to tasks such as vehicle control instruction computation. In some embodiments, a time scale at a mesoscopic level is typically from 10 to 1000 milliseconds and is relevant to tasks such as incident detection and pavement condition notification. In some embodiments, a time scale at a macroscopic level is longer than 1 second and is relevant to tasks such as route computing.

As used herein, the automation and/or intelligence levels of vehicles (V), infrastructure (I), and system (S) are described with respect to an "intelligence level" and/or an "automation level". In some embodiments, the vehicle intelligence and/or automation level is one of the following: V0: No automation functions; V1: Basic functions to assist a human driver to control a vehicle; V2: Functions to assist a human driver to control a vehicle for simple tasks and to provide basic sensing functions; V3: Functions to sense the environment in detail and in real-time and to complete relatively complicated driving tasks; V4: Functions to allow vehicles to drive independently under limited conditions and sometimes with human driver backup; and V5: Functions to allow vehicles to drive independently without human driver backup under all conditions. As used herein, a vehicle having an intelligence level of 1.5 (V1.5) refers to a vehicle having capabilities between vehicle intelligence 1 and vehicle intelligence level 2, e.g., a vehicle at V1.5 has minimal or no automated driving capability but comprises capabilities and/or functions (e.g., hardware and/or software) that provide control of the V1.5 vehicle by a CAVH system (e.g., the vehicle has "enhanced driver assistance" or "driver assistance plus" capability).

In some embodiments, the infrastructure intelligence and/or automation level is one of the following: I0: No functions; I1: Information collection and traffic management wherein the infrastructure provides primitive sensing functions in terms of aggregated traffic data collection and basic planning and decision making to support simple traffic management at low spatial and temporal resolution; I2: I2X and vehicle guidance for driving assistance, wherein, in addition to functions provided in I1, the infrastructure realizes limited sensing functions for pavement condition detection and vehicle kinematics detection, such as lateral and/or longitudinal position, speed, and/or acceleration, for a portion of traffic, in seconds or minutes; the infrastructure also provides traffic information and vehicle control suggestions and instructions for the vehicle through I2X communication; I3: Dedicated lane automation, wherein the infrastructure provides individual vehicles with information describing the dynamics of surrounding vehicles and other objects on a millisecond time scale and supports full automated driving on CAVH-compatible vehicle dedicated lanes; the infrastructure has limited transportation behavior prediction capability; I4: Scenario-specific automaton wherein the infrastructure provides detailed driving instructions for vehicles to realize full automated driving in certain scenarios and/or areas, such as locations comprising predefined geofenced areas, where the traffic is mixed (e.g., comprises automated and non-automated vehicles); essential vehicle-based automation capability, such as emergency braking, is provided as a backup system in case the infrastructure fails; and I5: Full infrastructure automation wherein the infrastructure provides full control and management of individual vehicles under all scenarios and optimizes a whole road network where the infrastructure is deployed; vehicle automation functionality is not necessary provided as a backup; full active safety functions are available.

In some embodiments, the system intelligence and/or automation level is one of the following: S0: no function; S1: the system provides simple functions for individual vehicles such as cruise control and passive safety function; the system detects the vehicle speed, location, and distance; S2: the system comprises individual intelligence and detects vehicle functioning status, vehicle acceleration, and/or traffic signs and signals; individual vehicles make decisions based on their own information and have partially automated driving to provide complicated functions such as assisting vehicle adaptive cruise control, lane keeping, lane changing, and automatic parking; S3: the system integrates information from a group of vehicles and behaves with ad-hoc intelligence and prediction capability, the system has intelligence for decision making for the group of vehicles and can complete complicated conditional automated driving tasks such as cooperative cruise control, vehicle platooning, vehicle navigation through intersections, merging, and diverging; S4: the system integrates driving behavior optimally within a partial network; the system detects and communicates detailed information within the partial network and makes decisions based on both vehicle and transportation information within the network and handles complicated, high level automated driving tasks, such as navigating traffic signal corridors, and provides optimal trajectories for vehicles within a small transportation network; S5: vehicle automation and system traffic automation, wherein the system optimally manages an entire transportation network; the system detects and communicates detailed information within the transportation network and makes decisions based on all available information within the network; the system handles full automated driving tasks, including individual vehicle tasks and transportation tasks, and coordinates all vehicles to manage traffic.

In some embodiments, the system dimension is dependent on the vehicle and infrastructure dimensions, e.g., as represented by the following equation (S=system automation; V=vehicle intelligence; and I=infrastructure intelligence):

$$S=f(V,I)$$

In some embodiments, vehicle intelligence is provided by and/or related to the CAV Subsystem and the infrastructure intelligence is provided by and/or related to the CAH Subsystem. One of ordinary skill in the art may refer to SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806)), which provides additional understanding of terms used in the art and herein.

DESCRIPTION

Provided herein is technology relating to automated driving and particularly, but not exclusively, to a Vehicle Intelligent Unit (VIU) configured to provide vehicle operations and control for Connected Automated Vehicles (CAV) and, more particularly, to a VIU configured to connect with a Collaborative Automated Driving System (CADS) and manage and/or control information exchange between CAV and CADS and manage and/or control CAV lateral and longitudinal movements, including vehicle following, lane changing, and route guidance. Although the disclosure herein refers to certain illustrated embodiments, it is to be understood that these embodiments are presented by way of example and not by way of limitation.

Vehicle Intelligent Unit (VIU)

The VIU is installed in a vehicle and provides an onboard subsystem of a CADS to the vehicle. The VIU provides CADS functions to the vehicle that assist or enable the vehicle to complete automated driving tasks. The VIU provides information exchange, data processing, and control command generation between the CADS and the vehicle through an information conversion system. In some embodiments, the VIU is configured to complement, enhance, backup, elevate, and replace the automated driving functions of the Conventional Vehicle Control System (CVCS) of the vehicle. In some embodiments, the VIU is complements, enhances, backs-up, elevates, and/or replaces the automated driving functions of the Conventional Vehicle Control System (CVCS) of the vehicle.

In some embodiments, the CVCS system is a vehicle control and actuator system and functions as a "brain" for executing automated driving functions for an autonomous vehicle. The CVCS is equipped on vehicles of varying intelligence levels and provides technologies to enable vehicles to operate safely in manually and/or automatic driving modes. These technologies include sensing (e.g., camera, radar, lidar), surveillance, global positioning, computing, artificial intelligence, and wireless and wireline communication (e.g., on-board mobile internet, inter-vehicle communication network, in-vehicle communication network).

In some embodiments, the VIU comprises an Interaction Subsystem (e.g., comprising a human-computer interaction module, an information conversion module, a communications module, and/or an on-board sensor access and information processing module); a Perception Subsystem (e.g., comprising a sensing and perception fusion module and/or a high-precision map and location identification module); a Decision Subsystem (e.g., comprising an intelligent control instruction/auxiliary module and/or a collaborative decision-making module), and/or a Supplemental Subsystem (e.g., comprising a supporting module and/or a redundancy verification module).

In some embodiments, e.g., as shown in FIG. 1, the technology relates to a collaborative automated driving system (CADS) and a CAV comprising a VIU. The VIU manages the human-computer interaction 108 between the driver 101 and the onboard system 102, and the VIU manages the communication 117 between the onboard systems 102 and external systems 103. Information is processed by the onboard system 102, e.g., by the sensing and perception layer 104, decision-making and control layer 105, and executive layer 106. The self-cognition and environment sensing 109 is transmitted from the sensing and perception layer 104 to the decision-making layer 105. The decision-making and control layer 105 communicates via the information and decision interaction 107 with the external systems 103, which include other vehicles 113, a road system 114, a cooperative management system 115, and/or a supporting system 116. Within the decision-making layer 105, the Vehicle Intelligent Unit (VIU) 112 and the Conventional Vehicle Control System (CVCS) 111 interact and collaborate to provide sensing and perception fusion 118, collaborative decision-making 119, and intelligent vehicle control 120. The integrated vehicle control instructions 110 generated from the decision-making layer 105 are then transmitted to the executive layer 106.

In some embodiments, e.g., as shown in FIGS. 2A-2E, the VIU 201 comprises subsystems and modules (FIG. 2A) that may be provided in combinations to provide embodiments of the VIU shown in FIGS. 2B-2E.

Figure 2A:
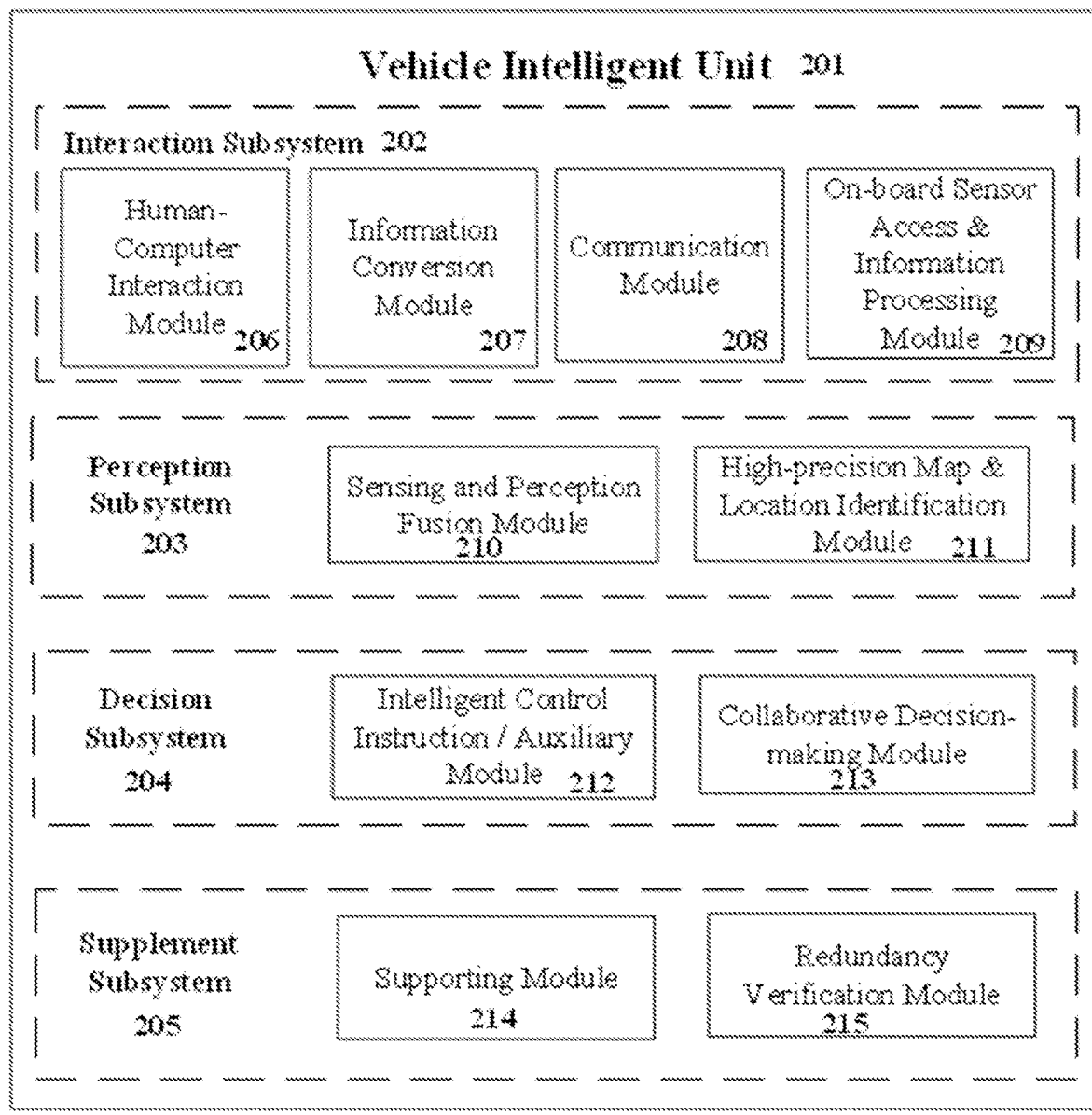
FIG. 2A is a schematic drawing showing the physical and/or functioning subsystems and modules in the Vehicle Intelligent Unit. 201: Vehicle Intelligent Unit; 202: Interaction Subsystem; 203: Perception Subsystem; 204: Decision Subsystem; 205: Supplement Subsystem; 206: Human-Computer Interaction Module; 207: Information Conversion Module; 208: Communication Module; 209: Onboard Sensor Access and Information Processing Module; 210: Sensing and Perception Fusion Module; 211: High Precision Map and Location Identification Module; 212: Intelligent Control Instruction/Auxiliary Module; 213: Collaborative Decision-making Module; 214: Supporting Module; 215: Redundancy Verification Module.

In some embodiments, e.g., as shown in FIG. 2A, the VIU 201 comprises subsystems and modules. The different subsystems are classified as: an interaction subsystem 202, a perception subsystem 203, a decision subsystem 204, and a supplement subsystem 205. The interaction subsystem 202 comprises a human-computer interaction module 206, an information conversion module 207, a communication module 208, and an on-board sensor access and information processing module 209. The perception subsystem 203 comprises a sensing and perception fusion module 210 and a high-precision map and location identification module 211. The decision subsystem 204 comprises an intelligent control instruction/auxiliary module 212 and a collaborative decision-making module 213. The supplement subsystem 205 comprises a supporting module 214 and a redundancy verification module 215. The VIU may be provided comprising various combinations and/or configurations of subsystems and modules to provide corresponding functions related to vehicle intelligence level of the vehicle in which the VIU is installed and particular driving tasks to be performed by the vehicle.

Figure 2B:
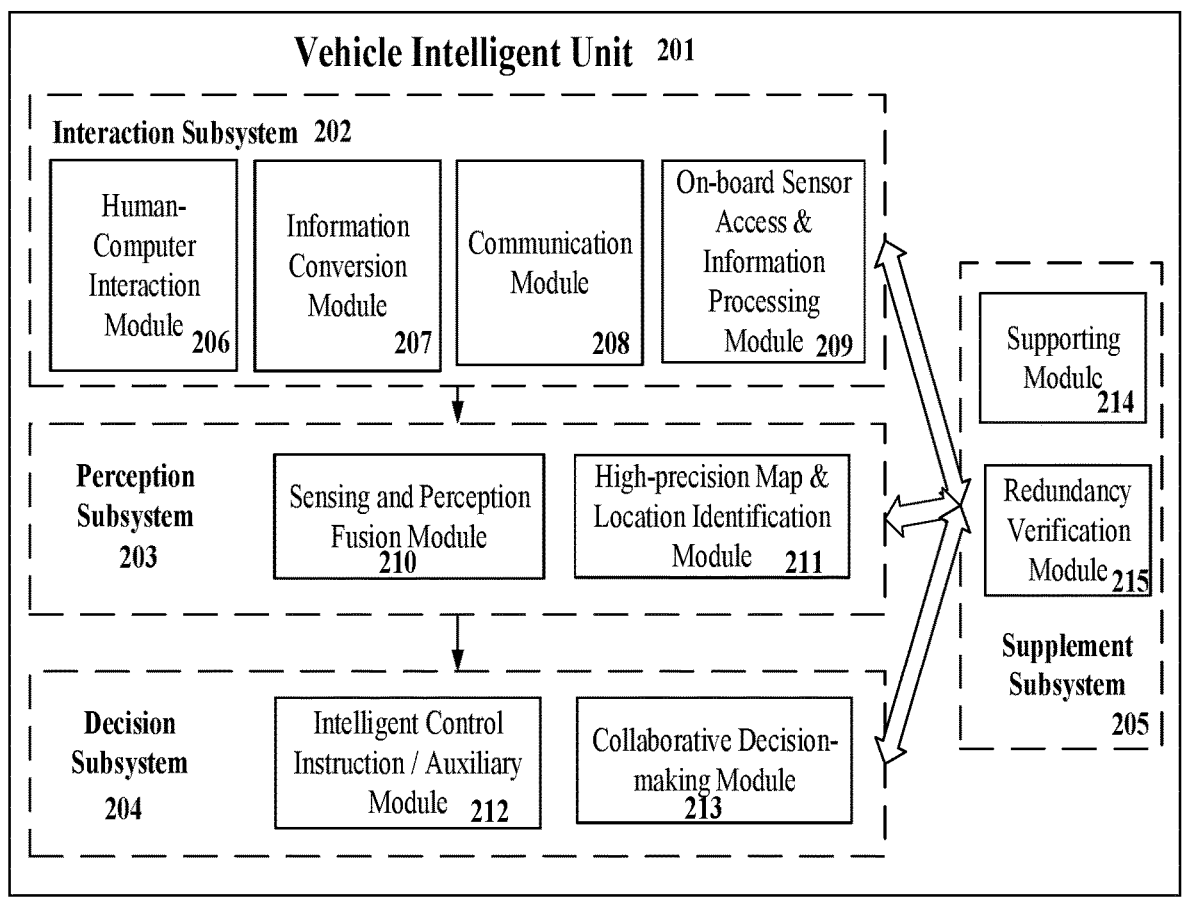
FIG. 2B is a schematic drawing showing exemplary logical connections between subsystems and/or modules of an embodiment of a VIU and exemplary data flows through the subsystems and/or modules of the embodiment of the VIU.

In some embodiments, e.g., as shown in FIG. 2B, the VIU comprises data flows among subsystems and/or modules of the VIU 2010. Sensing and other information related to the automated driving tasks is collected by the interaction subsystem 202 in the VIU 201 and the sensing and other information related to the automated driving tasks is sent to the perception subsystem 203. The perception subsystem 203 obtains internal environment information and external environment information by fusing and integrating the information from the interaction subsystem 202. Based on the results of the perception subsystem 203, driving decisions for vehicle control (e.g., and for execution of vehicle control instructions) are made by the decision subsystem 204. The supplement subsystem 205 provides resources such as power supply for each module and subsystem and maintains system security.

Figure 2C:
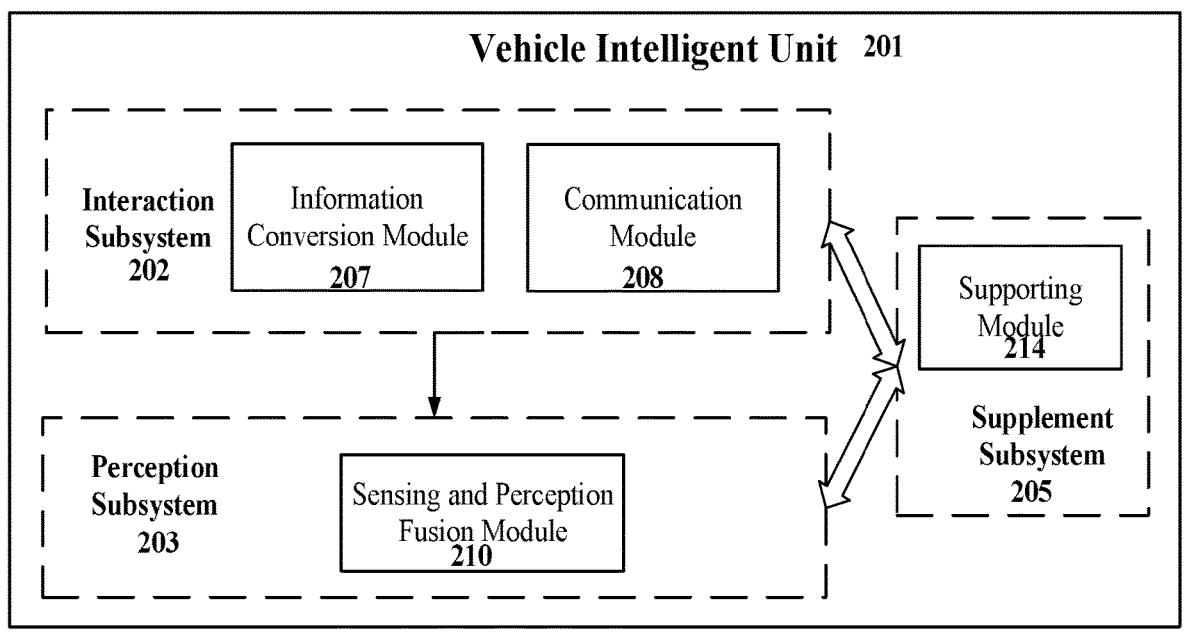
FIG. 2C is a schematic drawing showing an embodiment of a VIU comprising an exemplary subcombination of subsystems and/or modules shown in FIG. 2A.
Figure 2D:
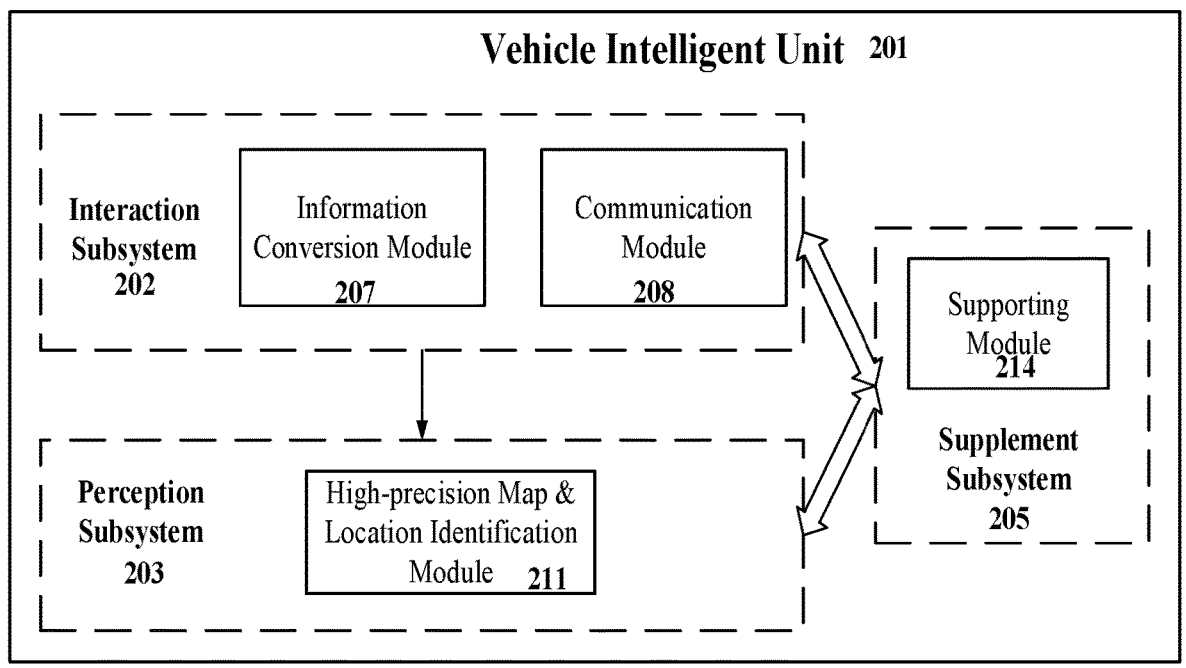
FIG. 2D is a schematic drawing showing an embodiment of a VIU comprising an exemplary subcombination of subsystems and/or modules shown in FIG. 2A.
Figure 2E:
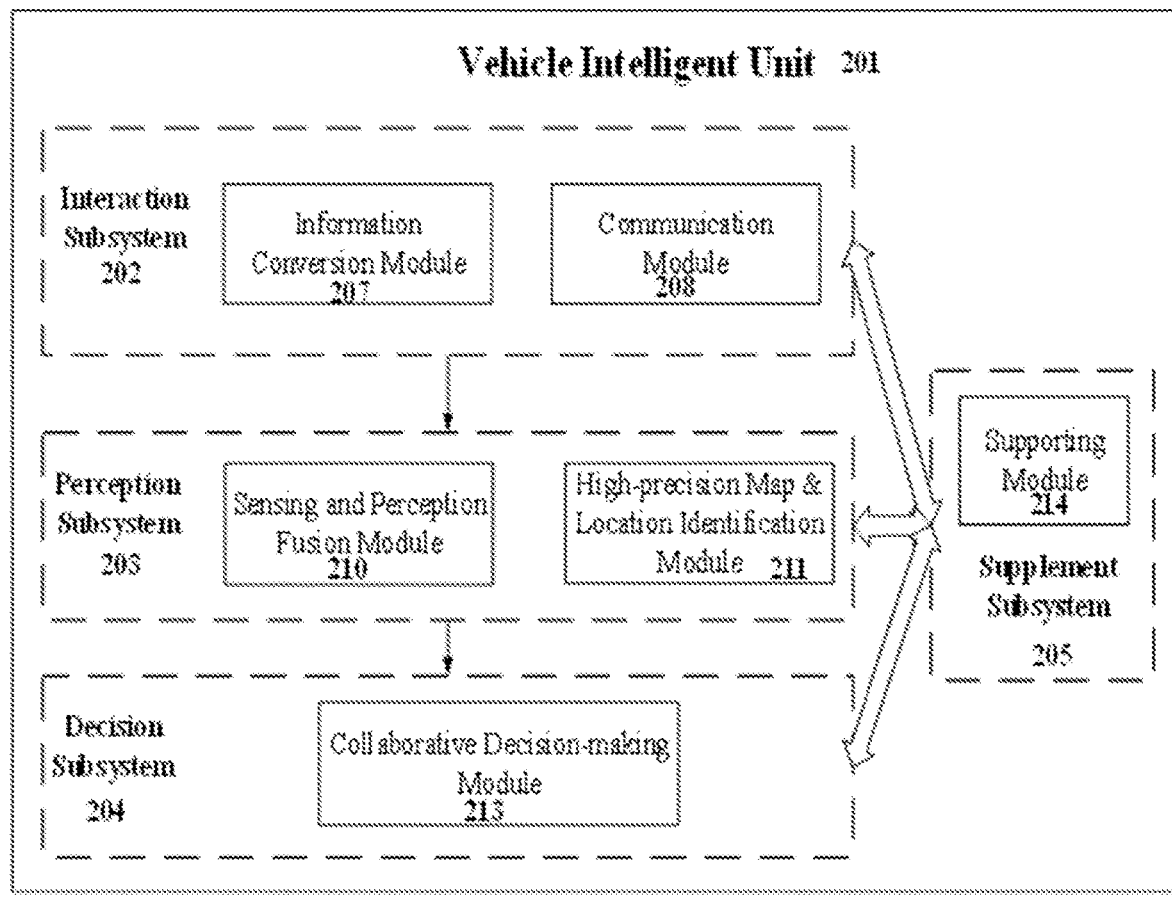
FIG. 2E is a schematic drawing showing an embodiment of a VIU comprising an exemplary subcombination of subsystems and/or modules shown in FIG. 2A.

In various embodiments, one or a plurality of the modules and functions in the VIU are flexibly combined and/or configured to complete some or all of the automated driving functions according to the CVCS and driving task requirements. In some embodiments, e.g., as shown in FIGS. 2C, 2D, and 2E, the VIU can be provided in combinations of subsystems and modules configured to complete automated driving functions. In some embodiments, e.g., as shown in FIG. 2C, the VIU comprises the information conversion module 207, communication module 208, and sensing and perception fusion module 210, which are supported by the supporting module 214. Accordingly, the VIU is configured to provide sensing and perception fusion function for the vehicle. In some embodiments, e.g., as shown in FIG. 2D, the VIU comprises the information conversion module 207, communication module 208, and high-precision map and location identification module 211, which are supported by the supporting module 214. Accordingly, the VIU is configured to provide high-precision map and location identification function for the vehicle. In some embodiments, e.g., as shown in FIG. 2E, the VIU comprises the information conversion module 207, communication module 208, sensing and perception fusion module 210, high-precision map and location identification module 211, and collaborative decision-making module 213, which are supported by the supporting module 214. Accordingly, the VIU is configured to provide sensing and perception fusion function, high-precision map and location identification function, and collaborative decision-making function for the vehicle.

Figure 3:
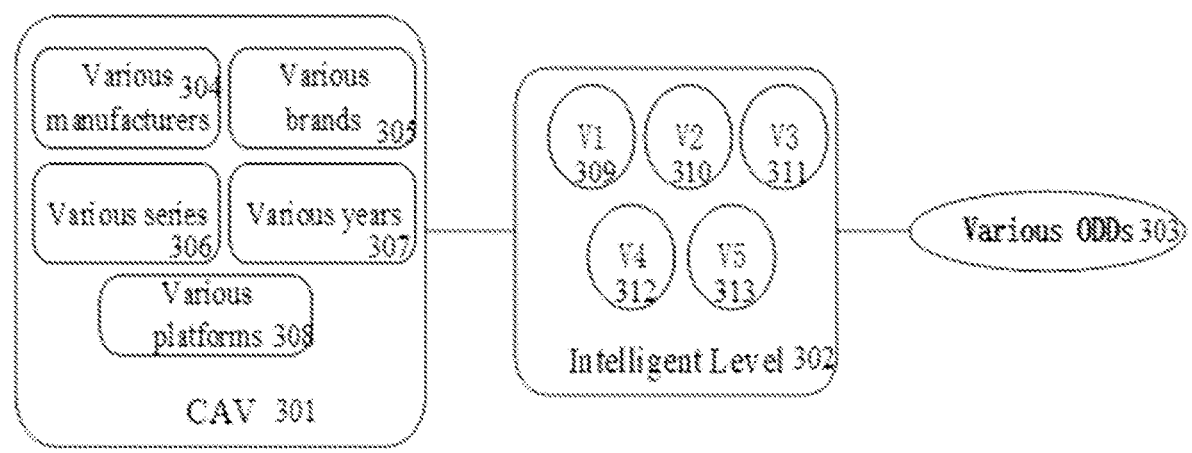
FIG. 3 is a schematic drawing showing the diversity of CAV manufacturers, brands, series, model years, and platforms; diversity of Operational Design Domain (ODD); and diversity of vehicle intelligence levels that find use and/or interact with embodiments of the VIU technology described herein. 301: CAV; 302: Intelligent Level; 303: Various ODDS; 304: Various manufacturers; 305: Various brands; 306: Various series; 307: Various years; 308: Various platforms; 309: V1; 310: V2; 311: V3; 312: V4; 313: V5.

In some embodiments, e.g., as shown in FIG. 3, the VIU may be provided in a variety of VIU configurations for different types of CAV 301. For instance, CAV 301 are provided by various manufacturers 304, various brands 305 of the vehicle manufacturers, various series 306 of the vehicle brands, various years 307 of vehicle product series, and various platforms 308 of the vehicle manufacturers. Further, CAV 301 are provided having a range of intelligence levels 302 and could have an intelligence level defined by SAE: V1 309, V2 310, V3 311, V4 312, or V5 313. The VIU can be applied to various ODD 303 as well.

Figure 4:
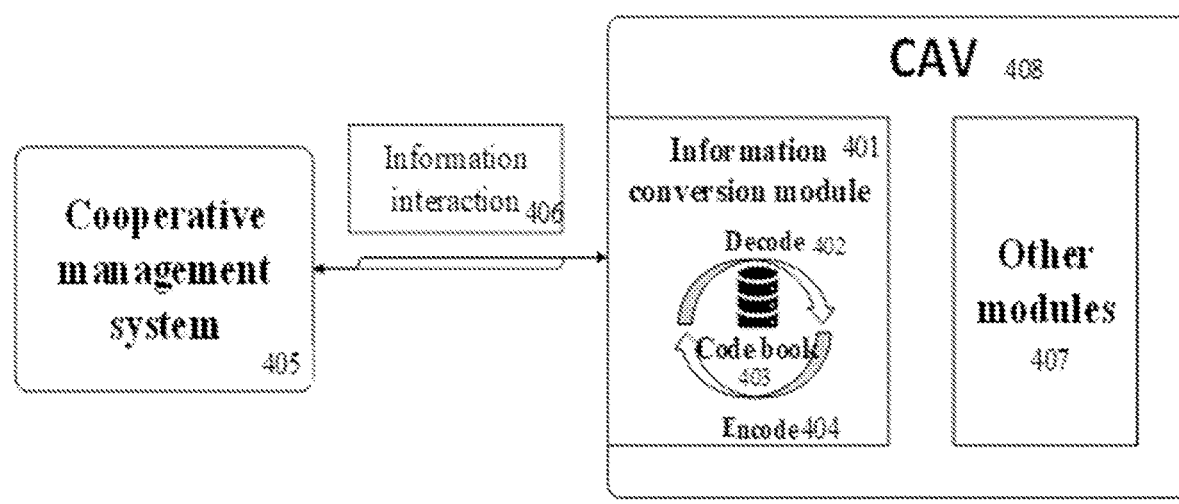
FIG. 4 is a schematic drawing showing information processing using an information conversion module. 401: Information conversion module. 402: Decode; 403: Code book; 404: Encode; 405: Cooperative management system; 406: Information interaction (e.g., information exchange); 407: Other modules; 408: CAV.

In some embodiments, e.g., as shown in FIG. 4, the technology provides information processing, e.g., by an information conversion module. The information conversion module 401 of the CAV 408 communicates through the information interaction (e.g., information exchange) 406 with the cooperative management system 405 of the CADS. Within the CAV 408, the information conversion module 401 executes the decoding 402 and the encoding 404 using the code book 403. Other modules 407 of the CAV 408 are also included in the process of information exchange.

Figure 5:
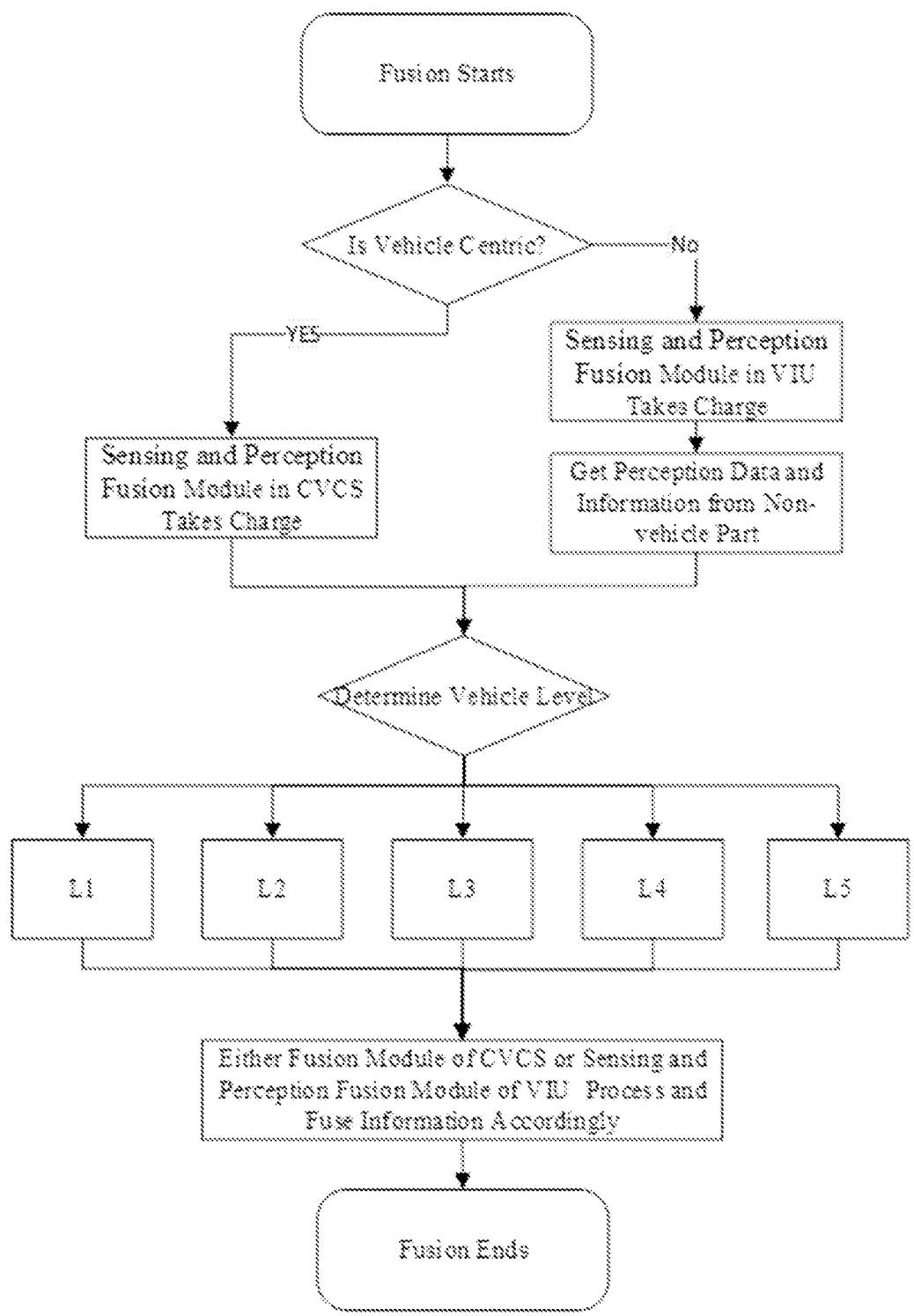
FIG. 5 is a flowchart showing embodiments of fusion and perception methods for vehicles having different intelligence levels, including assessing vehicle-centric perception and tasks performed by, e.g., a collaborative management system of the CADS, a fusion module in the CVCS, and/or a sensing and perception fusion module of the VIU.

In some embodiments, e.g., as shown in FIG. 5, the technology provides fusion and perception methods for vehicles having different intelligence levels. Vehicle-centric and non-vehicle-centric methods involve the collaborative management system of the CADS, the fusion module in the CVCS, and/or the fusion module of the VIU. Information from the collaborative management system of the CADS is processed in the perception fusion module of the VIU and is used to calibrate the vehicle-centric perception generated by the CVCS. The perception fusion modules in the VIU on a vehicle (e.g., at an intelligence revel 1, 2, 3, 4, or 5) provide drivers with supplemental perception information and various degrees of supervision replacement. Furthermore, the perception fusion modules focus on longitudinal and lateral trajectory planning and control and send information to the planning module. In some embodiments, the driver or the VIU may override and send information to the collaborative decision-making module to reduce the long-tail Operational Design Domain (ODD) risks and to provide more accurate dynamic HD maps, wider range environmental sensing, route planning information, and driving decisions.

Figure 6:
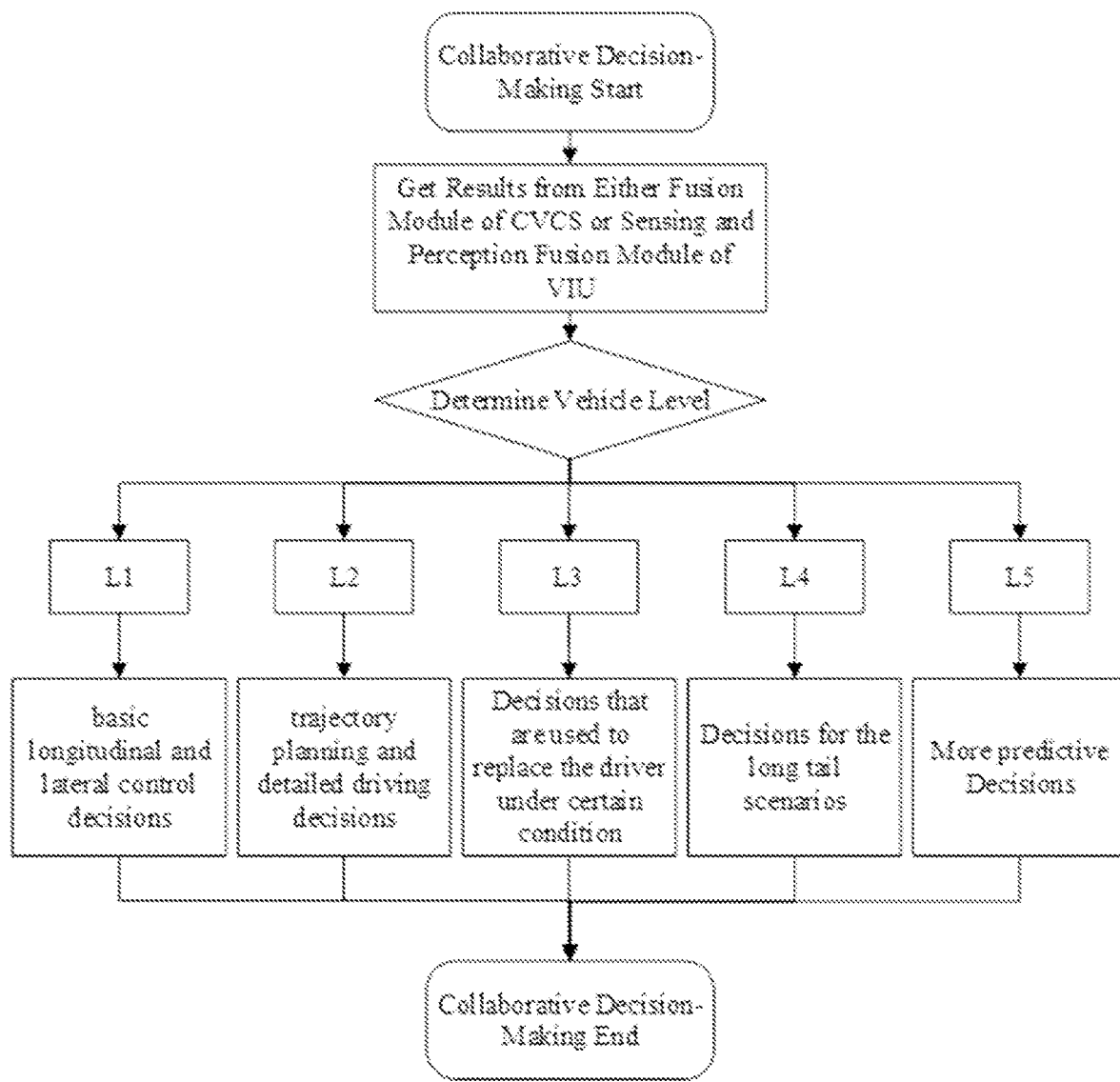
FIG. 6 is a flowchart showing embodiments of collaborative decision-making methods, including tasks performed by a collaborative decision-making module in the CVCS and a collaborative decision-making module of the VIU.

In some embodiments, e.g., as shown in FIG. 6, the technology provides collaborative decision-making methods involving the collaborative decision-making module in the CVCS and the collaborative decision-making module of the VIU. The collaborative decision-making module of the VIU generates driving decisions based on the results of perception fusion. The collaborative decision-making modules in VIU (e.g., on a vehicle at level 1, 2, 3, 4, or 5) improve automated driving by providing longitudinal and lateral control, assuming control of driving tasks, making trajectory planning and detailed driving decisions, replacing the driver under extreme conditions, reducing the long-tail Operational Design Domain (ODD) risks, and generating more predictive decisions.

Figure 7:
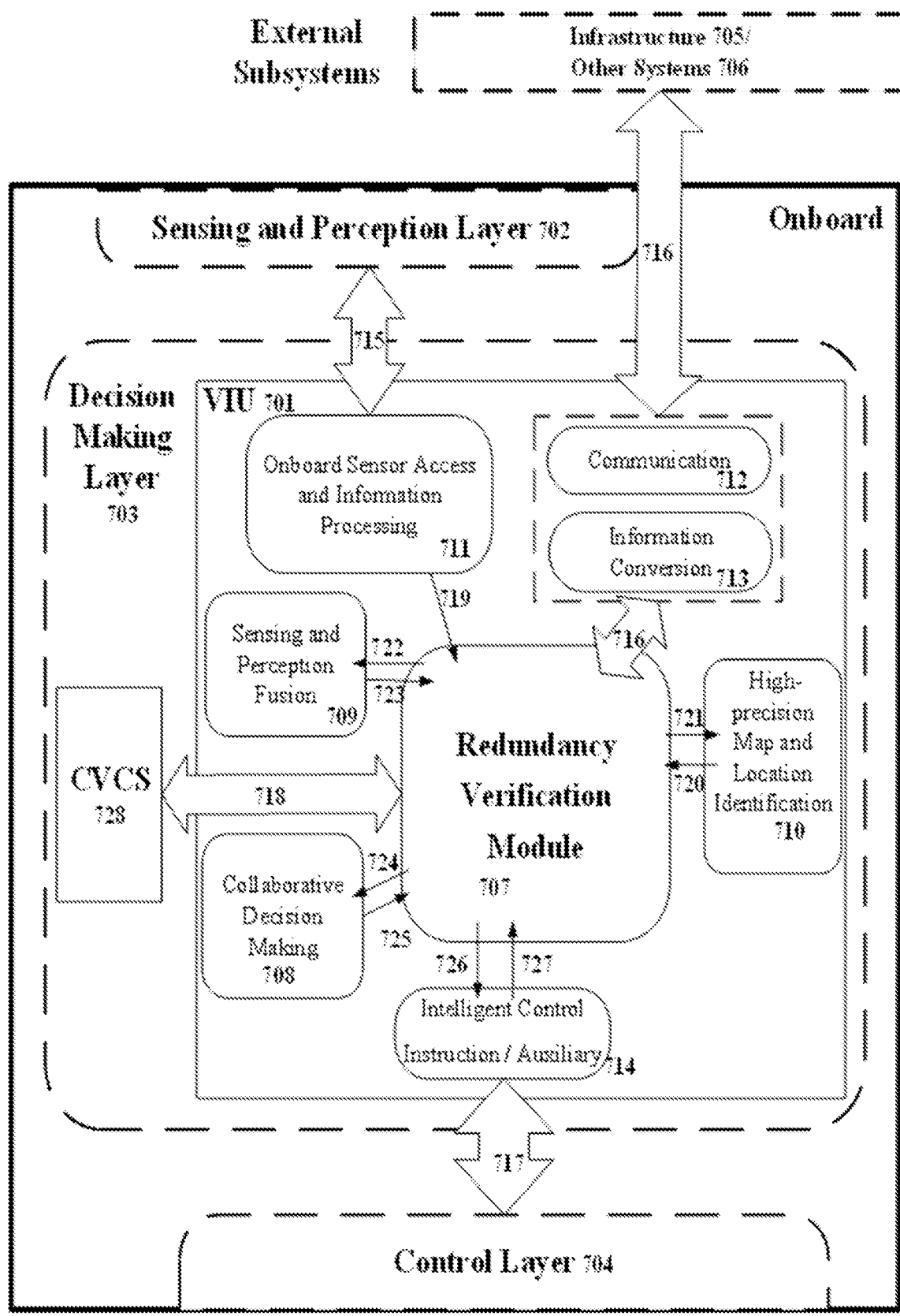
FIG. 7 is a schematic drawing showing embodiments of redundancy verification technologies. 701: VIU; 702: Sensing and Perception Layer; 703: Decision Making Layer; 704: Control Layer; 705: Infrastructure; 706: Other Systems; 707: Redundancy Verification Module; 708: Collaborative Decision Making Module; 709: Sensing and Perception Fusion Module; 710: High-precision Map and Location Identification Module; 711: Onboard Sensor Access and Information Processing Module; 712: Communication Module; 713: Information Conversion Module; 714: Intelligent Control Instruction/Auxiliary Module; 715: Data flow: Perception Information; 716: Data flow: Information/Decision/Control Instruction; 717: Data flow: Comprehensive Control Instruction; 718: Data flow: Control Decision/Instruction; 719: Data flow: Perception Results from Onboard Sensor Access and Information Processing Module; 720: Data flow: Localization Request to the Cloud (External System) via High-precision Map and Location Identification Module; 721: Data flow: HD Localization Information from the Cloud (External System) via High-precision Map and Location Identification Module; 722: Data flow: Perception Information from Onboard and External Systems; 723: Data flow: Fused Perception Results; 724: Data flow: Fused Perception Results and Decisions from External Systems; 725: Data flow: Decision Making Instructions made by VIU; 726: Data flow: Control Instruction from Onboard and External Systems; 727: Data flow: Comprehensive Control Instructions; 728: Conventional Vehicle Control System (CVCS).

In some embodiments, e.g., as shown in FIG. 7, the technology provides redundancy verification methods. The redundancy verification module 707 collects information (e.g., sensing and perception results, decision-making information, and other information) from the collaborative decision making module 708, the sensing and perception fusion module 709, the high-precision map and location identification module 710, and the onboard sensor access and information processing module 711. The Perception Information 715 is transmitted from the Onboard Sensing and Perception Layer 702 to the VIU 701 (e.g., through the communication module 712). The onboard sensor access and information processing module 711 of the VIU receives the Perception Information 715 from the Sensing and Perception Layer 702.

The Information/Decision/Control Instruction 716 is transmitted from external systems (e.g., the infrastructure 705 and other systems 706) to the VIU 701 via the communication module 712 and information conversion module 713. Then, the sensing and perception fusion module 709 and the high-precision map and location identification module 710 process the information. The redundancy verification module 707 interacts with the sensing and perception fusion module 709 and verifies and confirms the Perception Information 722 from Onboard and External Systems and the Fused Perception Results 723. Moreover, the redundancy verification module 707 interacts with the high-precision map and location identification module 710 and verifies and confirms the Localization Request 720 to the Cloud (External System) and HD Localization Information 721 from the Cloud (External System).

In the Decision Making Layer 703, the decision-making result and control decision/instruction 718 is generated by the CVCS 728 and is transmitted to the redundancy verification module 707 for verification and confirmation. Furthermore, in the Decision Making Layer 703, the decision-making instructions 725 of the VIU 701 are generated by the collaborative decision making module 708 using the fused perception results and instructions. The redundancy verification module 707 interacts with the collaborative decision making module 708 and shares the fused perception results and decisions from external systems 724. The redundancy verification module 707 then verifies and confirms the decision making instructions 725 made by VIU 701. Furthermore, this decision-making result and control decision/ instruction 718 is shared with the CVCS 728 and external systems.

Based on the decisions made by the collaborative decision making module 708, control instructions from onboard and external systems are generated in the intelligent control instruction/auxiliary module 714. The redundancy verification module 707 interacts with the intelligent control instruction/auxiliary module 714 and verifies and confirms the Control Instruction from Onboard and External Systems 726 and Comprehensive Control Instructions 727.

The comprehensive control instructions 717 are made using the outputs of the intelligent control instruction/ auxiliary module 714 and the comprehensive control instructions are transmitted to or shared with the Control Layer 704. Then, the execution result of the actuator in the Control Layer 704 is backed up by the VIU 701.

Figure 8:
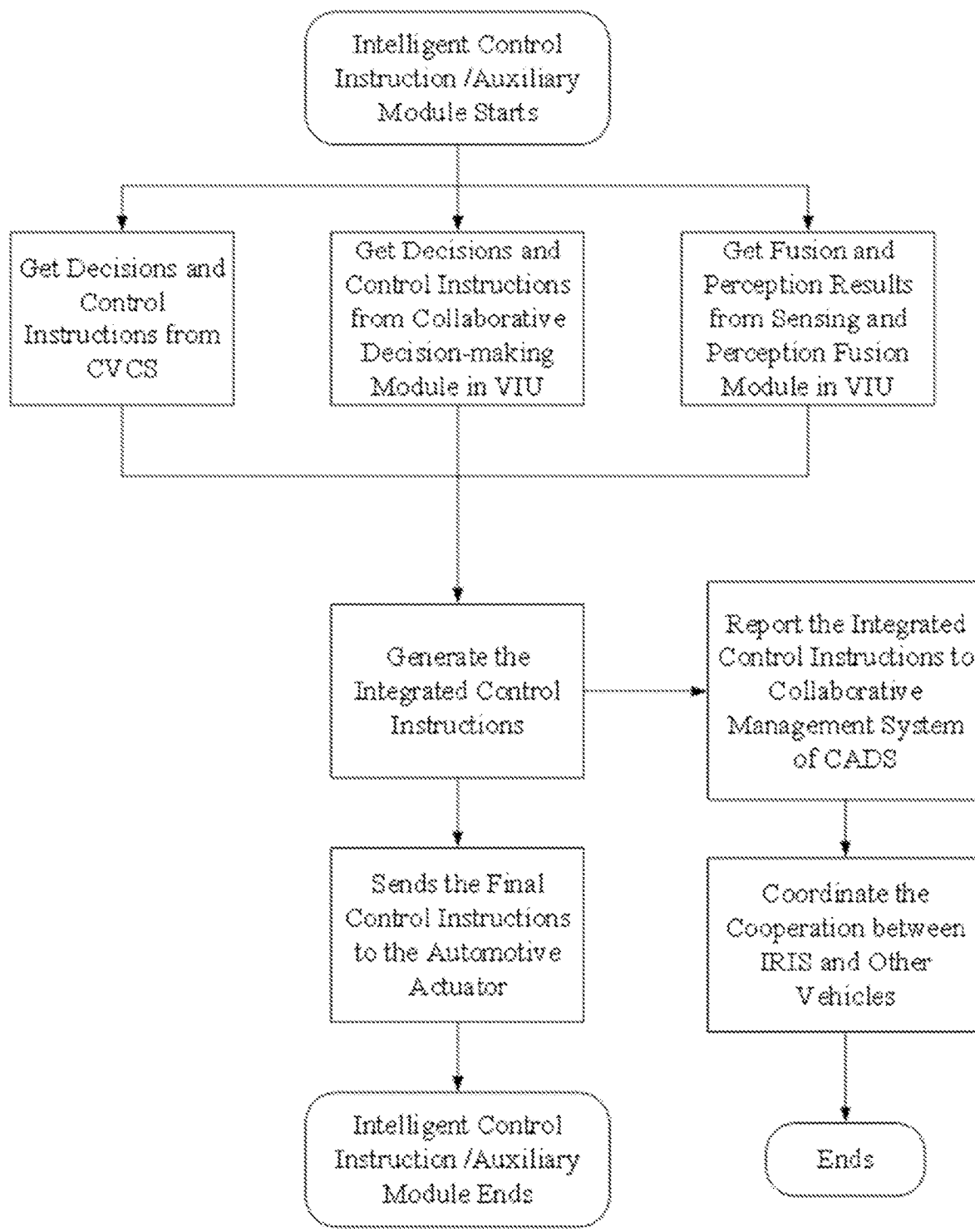
FIG. 8 is a flowchart showing the intelligent control instruction/auxiliary module functioning to combine decisions and control instructions from the VIU and other systems.

In some embodiments, e.g., as shown in FIG. 8, the technology provides an intelligent control instruction unit that works to combine the decisions and control instructions from the VIU and other systems. The process comprise three steps: (1) obtaining decisions and/or control instruction information from subsystems; (2) generating integrated control instructions; and (3) sending the results to a vehicle actuator and, optionally, reporting the result to the collaborative management system of the CADS.

Figure 9:
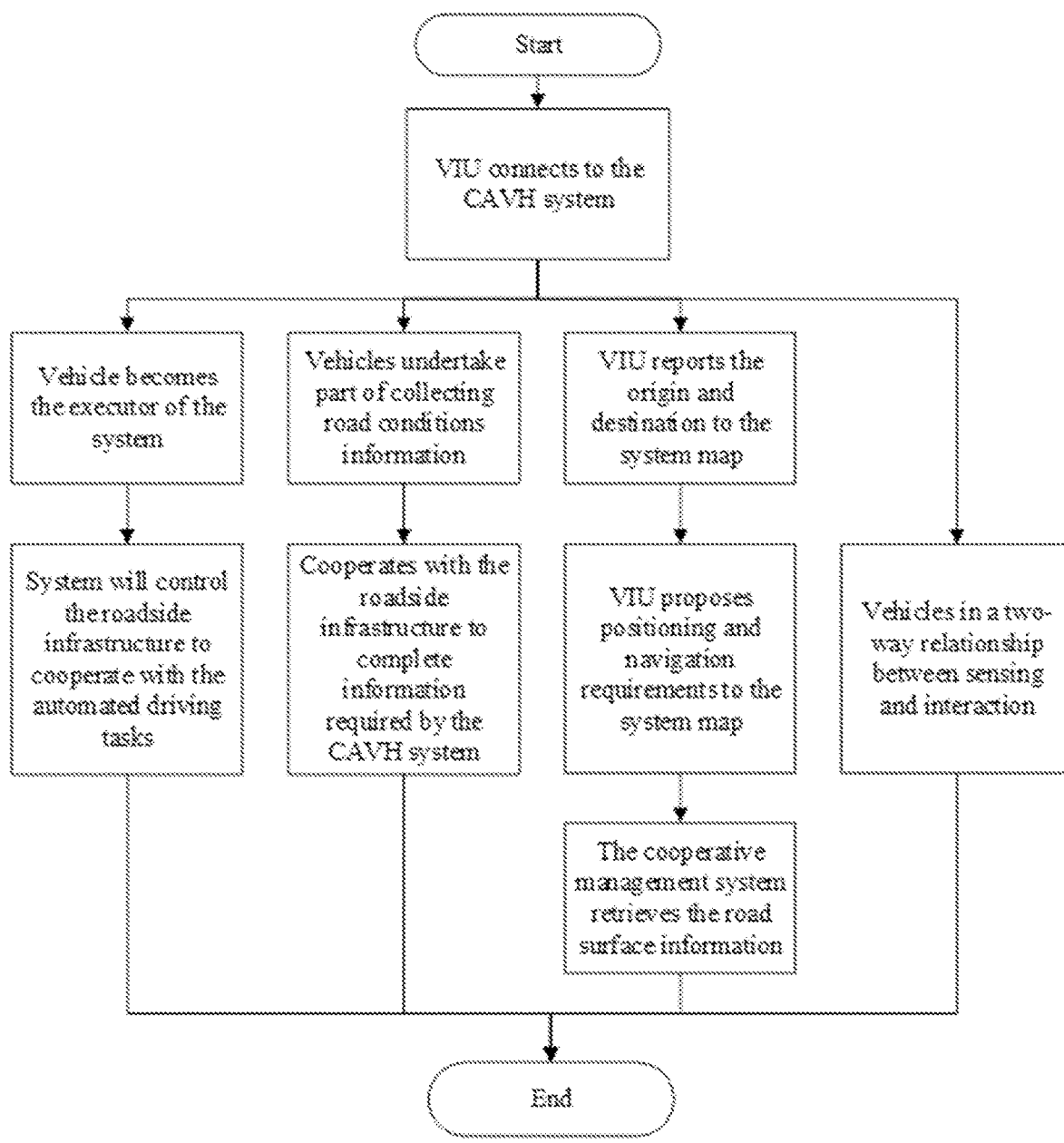
FIG. 9 is a flowchart showing automatic driving functions provided to a vehicle comprising a VIU connected to a CADS.

In some embodiments, e.g., as shown in FIG. 9, the technology provides automated driving functions that are activated and/or provided to a vehicle when the vehicle is equipped with a VIU and the VIU is connected to the CADS. After connecting to the CADS, four functions are activated. First, the vehicle becomes the actuator of the CADS instructions, which means that the VIU provides the vehicle with the CADS automatic driving functions and driving intelligence. The CADS coordinates with the IRIS or an IRIS subsystem (e.g., IRT or RIU). For example, in some embodiments, the IRIS coordinates with the roadside infrastructure (e.g., traffic lights) based on the vehicle driving information and actual control instructions transmitted by the VIU to cooperate with automatic driving tasks. Second, as a part of roadway traffic, vehicles collect road condition information. The vehicles cooperate with the IRIS to provide information required by the CADS, e.g., from multiple partial datasets describing road condition provided by individual vehicles in the traffic flow. Third, the VIU reports the origin and destination information to the system map and proposes positioning and navigation requirements to the system map of the CADS. The cooperative management system of the CADS retrieves route-specific road information for the vehicle based on the map information. The vehicle and other vehicles connected to the CADS share sensing information and interact with each other.

Figure 10:
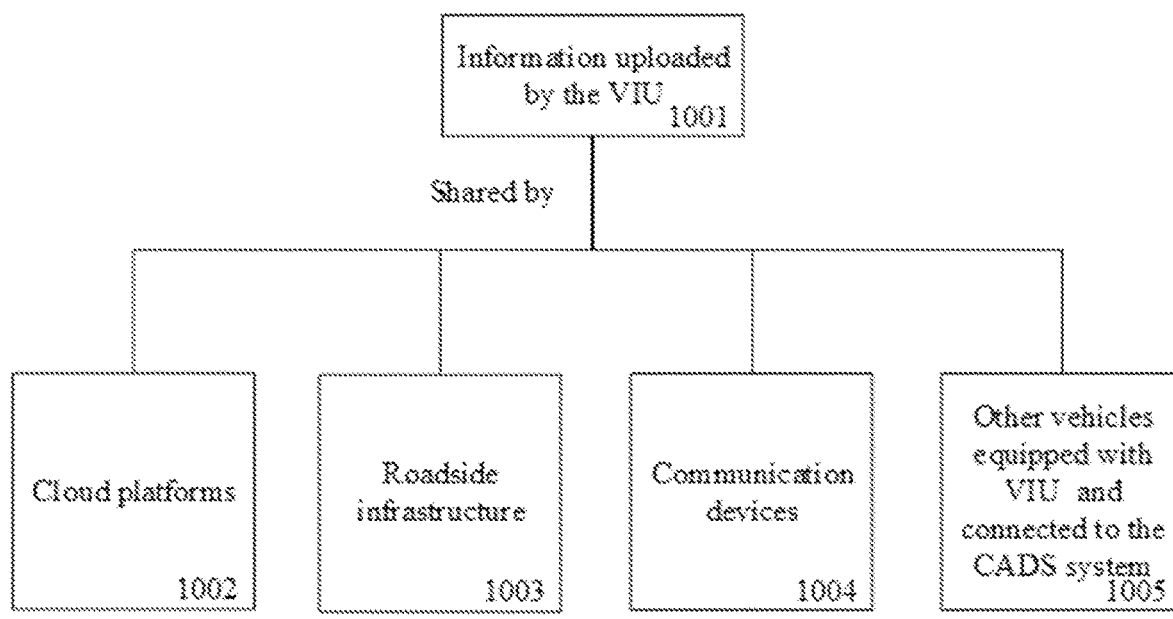
FIG. 10 is a schematic drawing describing information uploaded by a VIU (1001) and sharing of the uploaded information with users of the CADS (e.g., cloud platforms 1002, roadside infrastructure 1003, communication devices 1004, and other vehicles equipped with VIUs and connected to the CADS 1005).

In some embodiments, e.g., as shown in FIG. 10, the information transmitted by the VIU 1001 is shared with other users in the CADS. These users include cloud platforms 1002, roadside infrastructure 1003, communication devices 1004, and other vehicles equipped with VIU and connected to the CADS 1005.

Figure 11:
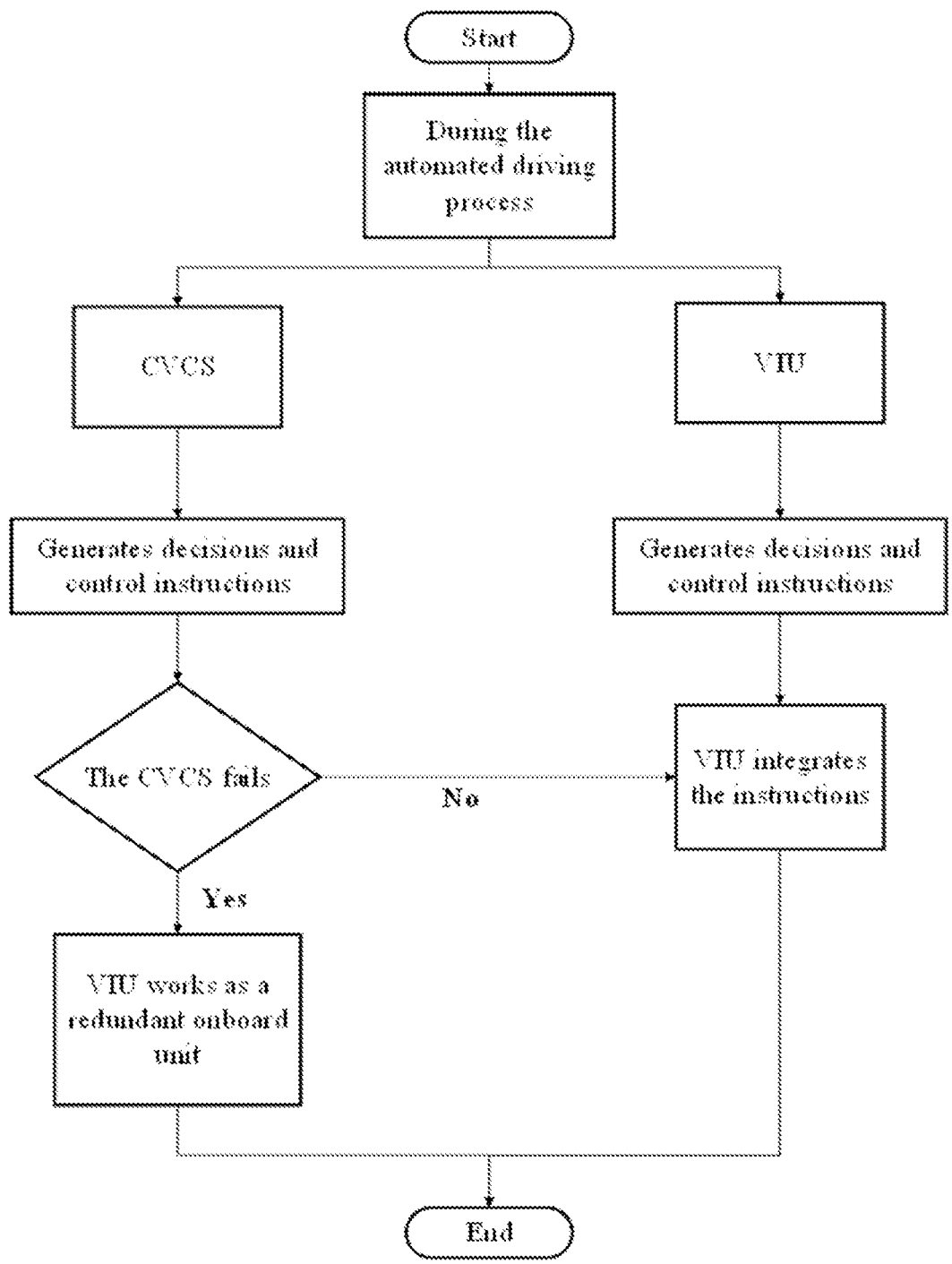
FIG. 11 is a flowchart showing methods for dividing labor and/or providing cooperation between the CVCS and the VIU.

In some embodiments, e.g., as shown in FIG. 11, the technology provides methods of dividing tasks and collaboration between the CVCS and the VIU. During automated driving, the CVCS generates driving decisions and vehicle control instructions, e.g., to respond to unexpected traffic conditions, using information sensed by the vehicle that describes the surrounding environment. The VIU generates driving decisions and vehicle control instructions in collaboration with the CADS, the IRIS, or an IRIS subsystem (e.g., IRT or RIU) using driving environment information provided by the vehicle and CADS. In some embodiments, the CADS environment information describes a larger area or describes a wider range than the information provided by the vehicle. The VIU may integrate the instructions generated by the CVCS and the VIU. When the CVCS fails, the VIU provides a redundant onboard unit to provide and/or maximize the stability of the automated driving functions.

Figure 12:
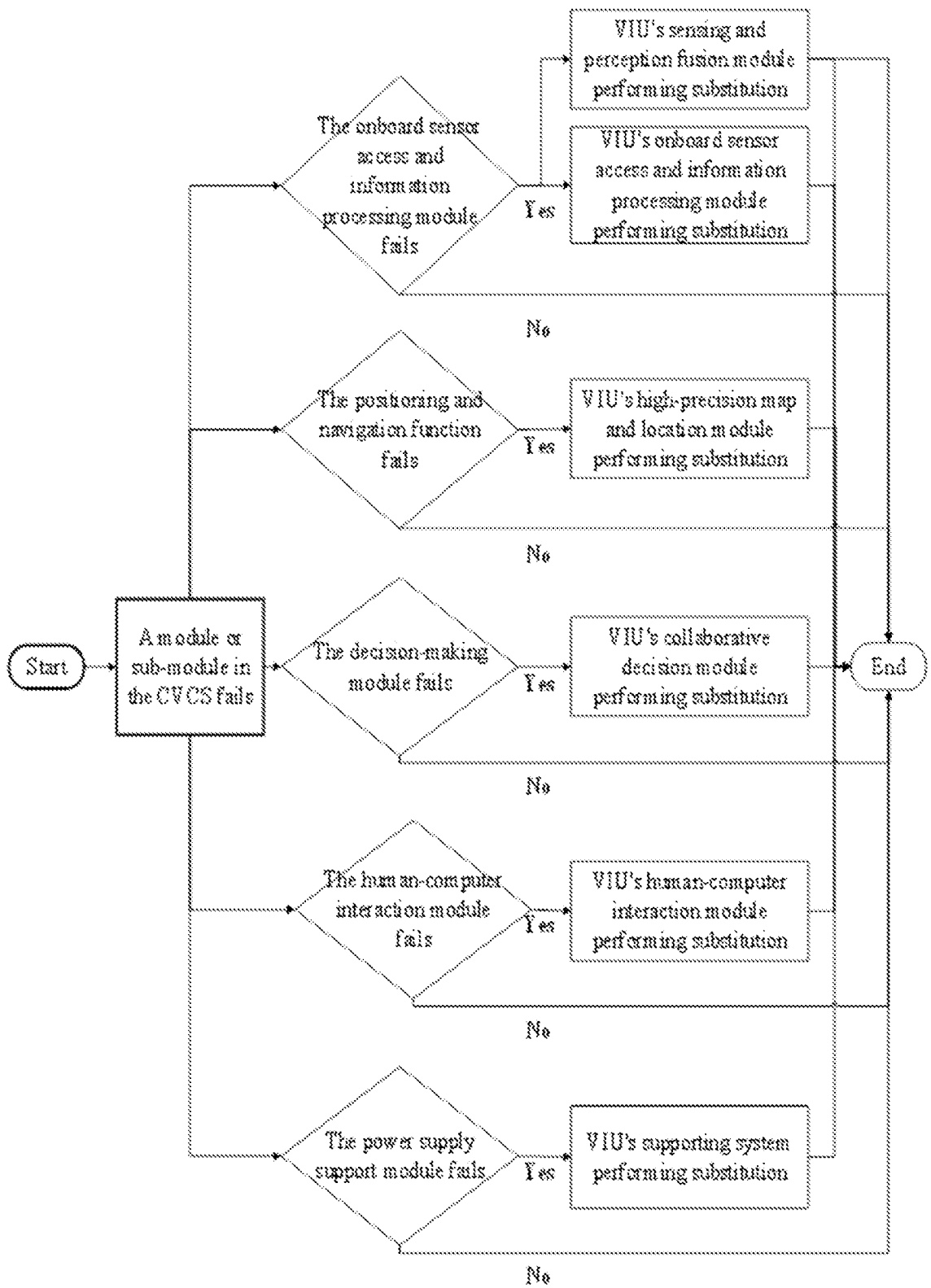
FIG. 12 is a flowchart showing methods for providing automatic driving to a vehicle by the modules and submodules of the VIU when the CVCS fails.

In some embodiments, e.g., as shown in FIG. 12, the provides modules and sub-modules in the VIU that help the vehicle to perform automated driving tasks when the CVCS fails. The VIU identifies the malfunctioning module or sub-module in the CVCS and activates the corresponding and/or appropriate VIU module or sub-module to help the vehicle system perform automated driving tasks. If the sensing and information processing module of the CVCS fails, the VIU system sensing and perception fusion module and/or the onboard sensor access and information processing module is activated to replace the sensing and information processing module of the CVCS. If the positioning and navigation function of the CVCS fails, the high-precision map and location identification module is activated to provide positioning and navigation services for the vehicle. If the decision-making module of the CVCS fails, the collaborative decision-making module is activate to the CVCS decision-making module. If the human-computer interaction function of the CVCS fails, the human-computer interaction module of the VIU is activated to exchange information with the driver. If the power supply support module of the CVCS fails, the VIU supporting module is activated to help the CVCS with power needs and power management.

Figure 13:
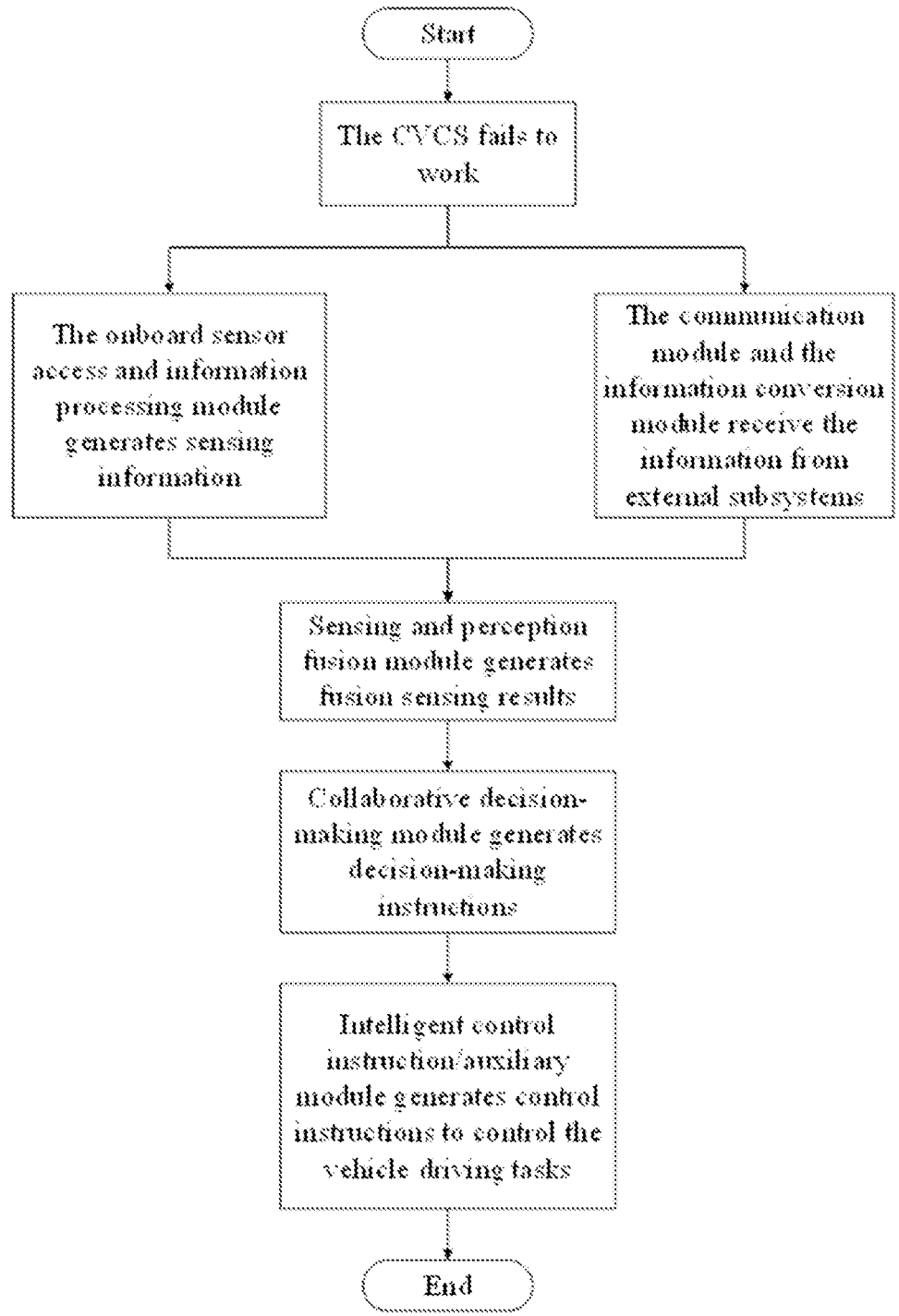
FIG. 13 is a flowchart showing methods for replacing a CVCS with VIU functions to provide automated driving tasks to a vehicle when the CVCS fails.

In some embodiments, e.g., as shown in FIG. 13, the technology provides methods for the VIU system to replace the CVCS and independently perform the automated driving tasks when the CVCS fails to work. The onboard sensor access and processing module generates sensing information and sends it to the fusion module. The communication module and the information conversion module receive information from external systems and send it to the fusion module. The sensing and perception fusion module fuses sensing information from the onboard sensor access and processing module and the information from external systems and sends the fused information to the collaborative decision-making module. The collaborative decision-making module generates the driving decision-making instructions and sends the driving decision-making instructions to the intelligent control instruction/auxiliary module to generate comprehensive vehicle control instructions for the vehicle automated driving tasks.

Figure 14:
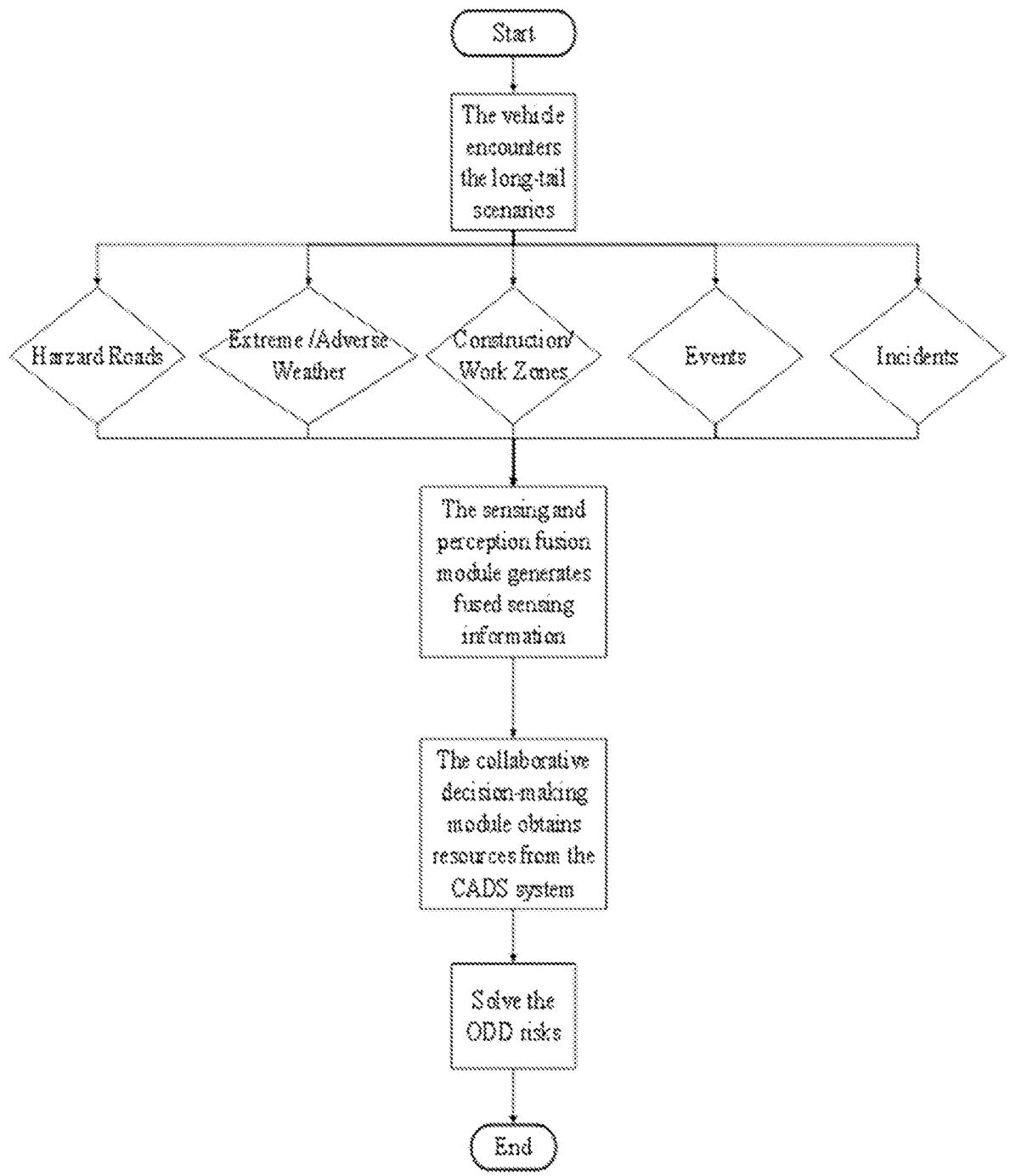
FIG. 14 is a flowchart showing an exemplary method for a VIU complement function.

In some embodiments, e.g., as shown in FIG. 14, the technology provides methods for the VIU system complement function. For example, in some embodiments, when a vehicle encounters a long-tail scenario (e.g., an incident; an event; a construction and/or a work zone; extreme and/or adverse weather; hazardous road; unclear markings, signing, and/or geometric designs; a high concentration of pedestrians/bikes; or a combination of the foregoing), the sensing and perception fusion module and the collaborative decision-making module of the VIU system complement the automated driving functions of the vehicle with sensing information, decision-making, and/or vehicle control instructions provided by the IRIS or an IRIS subsystem (e.g., IRT or RIU) and the CADS. Accordingly, the technology provides a solution to long-tail Operational Design Domain (ODD) risks.

Figure 15:
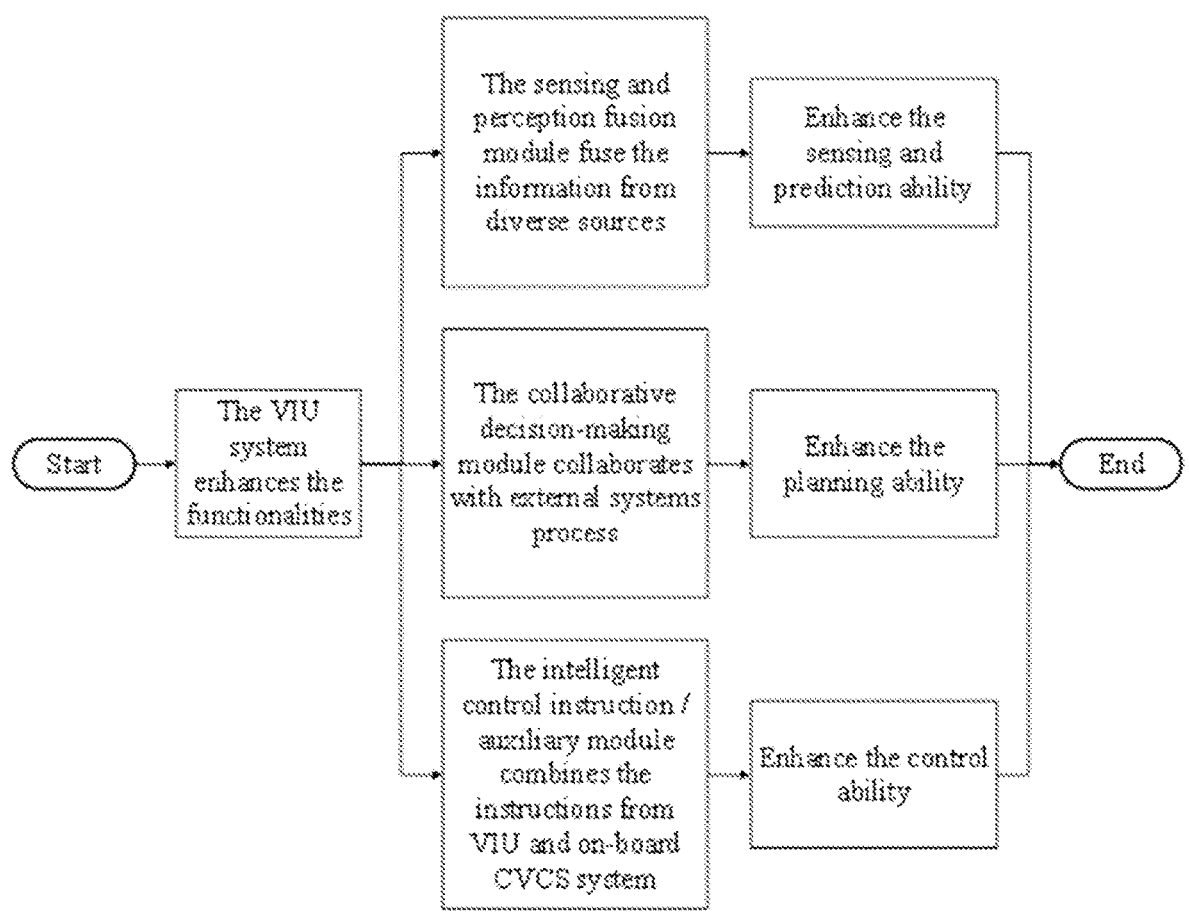
FIG. 15 is a flowchart showing an exemplary method for a VIU enhancement function.

In some embodiments, e.g., as shown in FIG. 15, the technology provides methods for the VIU system enhancement function. For example, in some embodiments, the VIU system enhances the automated driving functionalities of a vehicle using different modules. In some embodiments, the sensing and perception fusion module fuses information from the onboard systems, the cooperative management system of the CADS, and the external systems to enhance the sensing and prediction ability of the vehicle. In some embodiments, the collaborative decision-making module collaborates with external systems in the CADS to enhance the vehicle planning ability. In some embodiments, the intelligent control unit fuses driving instructions from the VIU and driving instructions from the onboard CVCS system to generate integrated control instructions that enhance the control ability of the vehicle.

Figure 16:
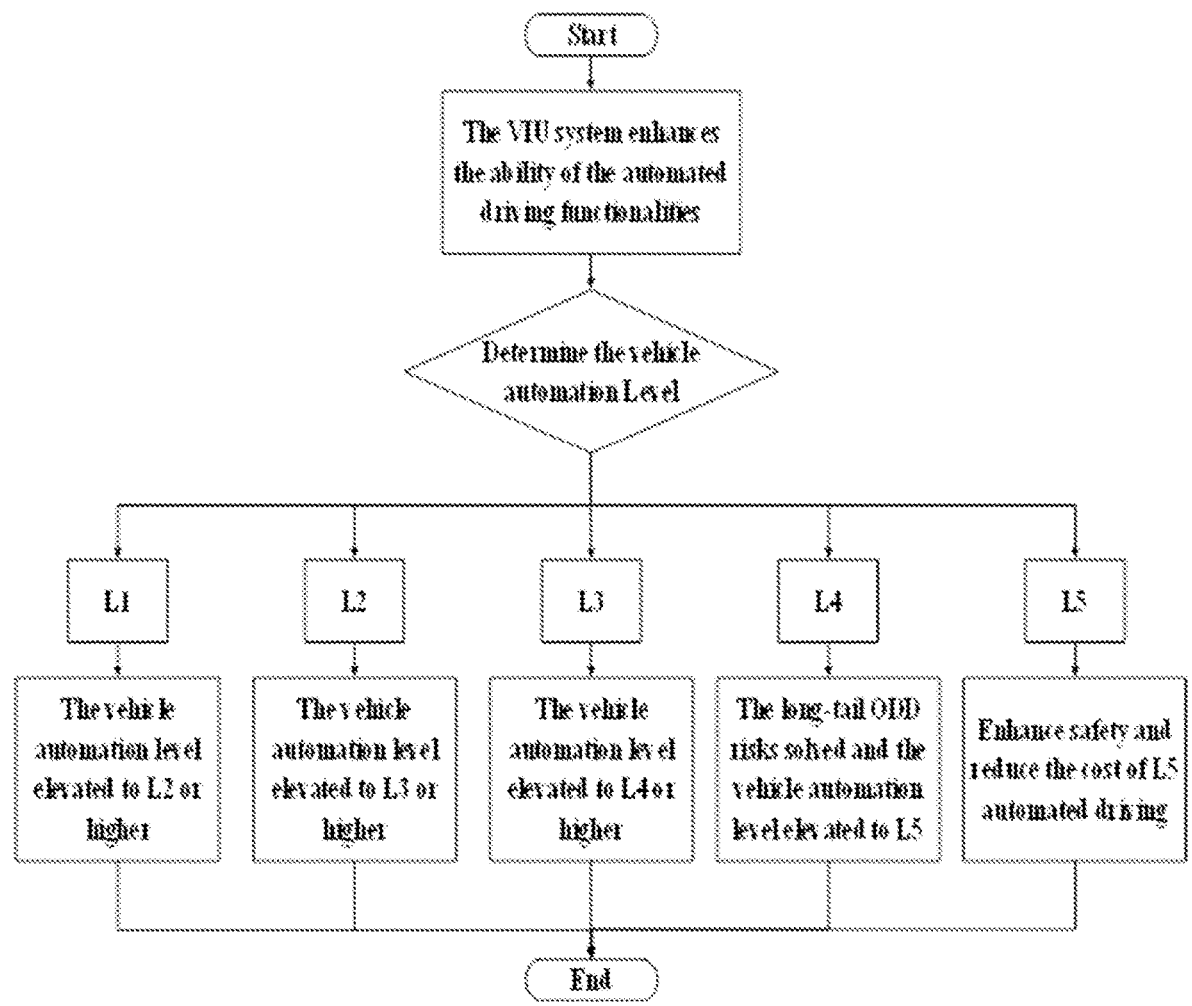
FIG. 16 is a flowchart showing an exemplary method for a VIU elevation function.

In some embodiments, e.g., as shown in FIG. 16, the technology methods for the VIU system elevation function. For example, in some embodiments, the VIU elevates the level of an automated vehicle from a lower intelligence level to a higher intelligence level by enhancing the ability of the automated driving functionalities of the vehicle. In some embodiments, the intelligence level of a vehicle having intelligence level 1 can be elevated to intelligence level 2, 3, 4, or 5. In some embodiments, the intelligence level of a vehicle having intelligence level 2 can be elevated to intelligence level 3, 4, or 5. In some embodiments, the intelligence level of a vehicle having intelligence level 3 can be elevated to intelligence level 4 or 5. In some embodiments, the intelligence level of a vehicle having intelligence level 4 can be elevated to intelligence level 5. For example, in some embodiments, the technology elevates the intelligence of a vehicle having intelligence level 4 to intelligence level 5 by providing assistance to solve long-tail ODD risks. In some embodiments, the VIU system elevation function improves and/or maximizes the safety of vehicles having intelligence level 5. In some embodiments, the VIU system elevation function decreases and/or minimizes the costs of vehicles having intelligence level 5.

Figure 17A:
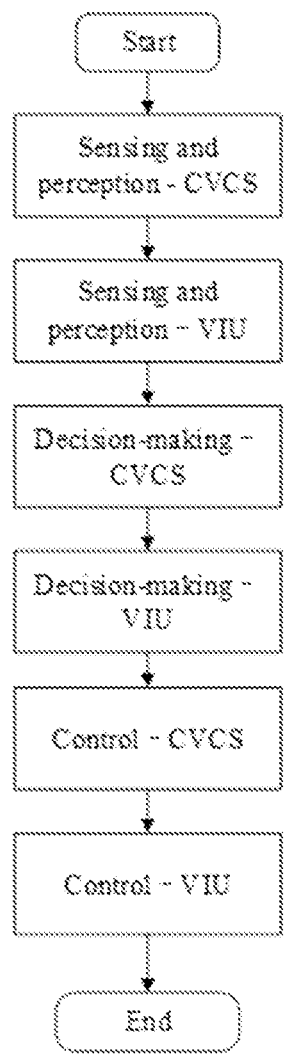
FIG. 17A is a flowchart showing an embodiment of a collaboration method for automated driving in which the VIU and the CVCS collaborate to provide information processing using a sequential information processing architecture.
Figure 17B:
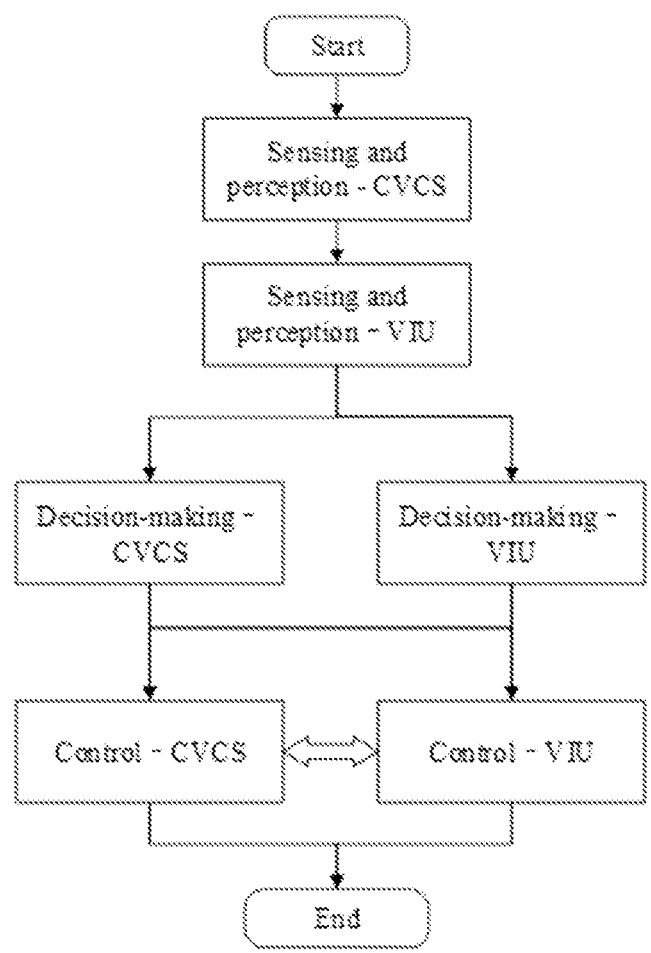
FIG. 17B is a flowchart showing an embodiment of a collaboration method for automated driving in which the VIU and the CVCS collaborate to provide information processing using an information processing architecture that combines parallel, sequential, and crossover information processing.

In some embodiments, e.g., as shown in FIGS. 17A and 17B, the technology provides collaboration between the VIU and the CVCS for information processing in automated driving.

In some embodiments, e.g., as shown in FIG. 17A, the technology provides a sequential information processing architecture for the CVCS and the VIU. The CVCS senses the environment and transmits sensing data to the VIU for fusion of sensing and perception information and the VIU. The VIU provides the fused sensing and perception information to CVCS and, in some embodiments, sends the fused sensing and perception data to other subsystems of the CADS. The CVCS uses the sensing and perception data received from the VIU to makes driving decisions for vehicle control. The driving decisions produced by the CVCS are sent to the VIU and the VIU (e.g., the collaborative decision-making module of the VIU) makes a final driving decision after receiving the driving decision results from the CVCS and other information from the CADS. The driving decisions produced by the VIU (e.g., by the collaborative decision-making module of the VIU) are transmitted to the CVCS. The CVCS uses the driving decision to produce initial vehicle control instructions and sends the vehicle control instructions to the VIU intelligent control instruction/auxiliary module. After being verified by the redundancy verification module in the VIU, initial vehicle control instructions are used to produce comprehensive control instructions by VIU for controlling the vehicle.

In some embodiments, e.g., as shown in FIG. 17B, the technology provides an information processing architecture of the CVCS and the VIU that combines parallel, sequential, and crossover approaches. First, the CVCS senses the environment, the onboard systems, and surrounding vehicles to provide sensing data. Second, the CVCS transmits the sensing data to the VIU for perception fusion to provide fused perception information. The fused perception information is used by the VIU and the CVCS. The VIU makes decisions using the fused perception information and positioning information and outputs decision-making results to the VIU control module. The CVCS makes decisions using the fused perception information and positioning information and outputs decision-making results to the CVCS control module. The VIU control module processes the VIU decision-making results and produces VIU control instructions. The CVCS control module processes the CVCS decision-making results and produces CVCS control instructions. The CVCS control module shares the CVCS control instructions with the VIU. The VIU control module shares the VIU control instructions with the CVCS. The VIU (e.g., the redundancy verification module of the VIU) verifies the CVCS control instructions and/or the CVCS verifies the VIU control instructions. The verified control instructions are executed by the vehicle. The decision-making results from the decision-making module of the CVCS and the control instructions from the control module of the CVCS are backed up by the VIU.

Thus, as described herein, the technology relates to a VIU that provides a vehicle with full automated driving functions comprises a number of the following modules: an onboard sensor access and information processing module, a communication module, an information conversion module, a sensing and perception fusion module, a high precision map and location identification module, a collaborative decision making module, an intelligent control instruction/auxiliary module, a redundancy verification module, a human-computer interaction module, and/or a supporting module. In some embodiments, a number of these modules of the VIU is flexibly configured to complete some or all of the automated driving functions according to the CVCS and driving task requirements. In some embodiments, a VIU is configured (e.g., the VIU comprises a number of modules) to provide and/or provides full automated driving to a vehicle.

In some embodiments, the onboard sensor access and information processing module is configured to receive and/or receives information collected by onboard sensors and process the information. In some embodiments, the onboard sensor access and information processing module replaces the information processing function of the CVCS.

In some embodiments, the communication module is configured to exchange and/or exchanges information, decisions, and comprehensive control instructions between the onboard systems of the vehicle and external systems (e.g., the infrastructure and components of the CADS external to the vehicle). The communication module provides communications functions and network support for the operations of the VIU modules. In some embodiments, the communication module provides wired communication and/or wireless communication, which are used for information sharing and exchange among the VIU (e.g., the vehicle comprising the VIU), the cooperative management system of the CADS, the Intelligent Road Infrastructure System (IRIS), and other vehicles. In some embodiments, the communication technology comprises one or more communication technologies, including 4G, 5G, 6G, 7G, dedicated short-range communication (DSRC), IEEE 802.11p, and/or cellular V2X (C-V2X) technology.

In some embodiments, the information conversion module is configured to provide and/or provides information coding, information decoding, information translation, and/or information conversion for information exchange between onboard subsystems (e.g., VIU and/or vehicle subsystems) and external systems (e.g., CADS subsystems). In some embodiments, the information conversion module comprises a built-in coding dictionary and communication protocols. In some embodiments, the information conversion module comprises technology described in, e.g., U.S. Pat. App. Ser. No. 63/137,243, which is incorporated herein by reference. In some embodiments, a CADS provides automated driving for a plurality of heterogeneous Connected Automated Vehicles (CAV) and an Intelligent Information Conversion System (TICS) provides a Code Book configured to convert and/or that converts information (e.g., by encoding and decoding) between formats and standards used by different vehicles. In some embodiments, CADS provides sensing, decision-making, and/or control instructions for a specific vehicle and the IICS converts the sensing, decision-making, and/or control instructions into a format usable by the particular vehicle. In some embodiments, a particular vehicle provides sensing information and/or other data to the CADS and the IICS converts the sensing information and/or other data into a format usable by the CADS. Therefore, in some embodiments, the VIU of the CAV receives sensing, decision-making, and/or control instructions through the IICS to carry out driving tasks and the CADS receives sensing information and/or other data through the IICS from a VIU to provide automated driving for vehicles. In some embodiments, the CADS sends sensing, decision-making, and/or control instructions through the IICS to the VIU of the CAV for automated driving and the VIU sends sensing information and/or other data through the IICS to the CADS. The IICS converts information (e.g., by encoding and decoding) between formats and standards for vehicles on all road types and provides or facilitates the intelligent allocation of functions, resources, and/or services for collaborative automatic driving; enhances system service levels; and/or provides higher-level information, intelligence, and coordination.

In some embodiments, the information conversion module is configured to convert and/or converts information (e.g., converts information formats and/or standards) among different roads (e.g., different road infrastructure logical and/or physical components), different vehicles, different communications protocols, different environments, and/or different communication conditions. Accordingly, in some embodiments, the IICS module receives, compiles, converts, and/or transmits information for exchange among subsystems of the CADS, such as vehicle onboard systems, other vehicles, the IRIS or its subsystems such as an IRT or a RIU, and other automated driving systems. In some embodiments, the information conversion module provides an information coding function, which encodes information and data for automated driving tasks of a CAV using a coding dictionary. In some embodiments, information exchange includes uploading (e.g., by a CAV) a driving demand, driving information, and/or vehicle environment information of a CAV to the cooperative management system of the CADS. In some embodiments, the Interaction Subsystem receives information from other CADS subsystems and the information is transmitted to VIU subsystems for fusion of sensing data and collaborative decision-making of the VIU. In some embodiments, the Interaction Subsystem uploads real-time performance data of autonomous driving to the cooperative management system of the CADS.

In some embodiments, the sensing and perception fusion module fuses sensing and perception information of the onboard subsystems and the external systems. In some embodiments, the sensing and perception fusion module outputs the fusion results of onboard and environment perception to the collaborative decision making module of the VIU.

In some embodiments, the collaborative decision-making module is configured to provide and/or provides decision-making, path planning, security identification, and/or output control instructions based on the fusion perception information.

In some embodiments, the high-precision map and location identification module is configured to load and/or loads a high-precision map provided by the vehicle or the CADS and location identification is performed using a high-precision map, satellite navigation and network, Internet of Things (IOT) devices, and/or geo-tags.

In some embodiments, the intelligent control instruction/auxiliary module is configured to coordinate and/or coordinates control instructions provided by the vehicle CVCS and the VIU decision making module to generate comprehensive control instructions for the vehicle actuator.

In some embodiments, the redundancy verification module is configured to verify and/or verifies the control instructions from the vehicle CVCS and external systems to improve the safety performance of the vehicle.

In some embodiments, the human-computer interaction module is configured for drivers to input and/or receives driver inputs for destination information, driving requirements, control instructions, etc. In some embodiments, the human-computer interaction module shows external information and working status to the driver. When driver intervention is needed, the driver is prompted by the VIU to assume control of the vehicle.

In some embodiments, the supporting module is configured to manage and/or manages supply of power to each module. In some embodiments, the supporting module manages supply of power to each module to ensure that each module receives power to function adequately. In some embodiments, the supporting module is configured to maintain and/or maintains the security of the communication network and the VIU system.

In some embodiments, the functions and modules in the VIU are flexibly configured to complete some or all of the automated driving functions according to the CVCS and driving task requirements.

For example, in some embodiments, the VIU is installed on a vehicle having an intelligence level from 1 to 5 (e.g., L1, L2, L3, L4, or L5 or V1, V2, V3, V4, or V5), e.g., as defined by SAE. The VIU enables vehicles to work with an IRIS having an intelligence levels from 1 to 5 (e.g., I1, I2, I3, I4, or I5) to provide support to a CADS having an intelligence level from 1 to 5 (e.g., S1, S2, S3, S4, or S5). In some embodiments, the VIU is configured to comprise different design configurations to provide a functional subsystem of different CADS.

In some embodiments, the VIU provides automated driving functions and/or services for a CAV to perform various automated tasks in a number of collaborative automated driving systems and/or scenarios. For example, embodiments of the VIU technology provide automated driving for different types of CAV operating at different automation levels, operating in various collaborative automatic driving states, and/or performing various driving tasks for autonomous driving. In some embodiments, the VIU provides automated driving functions and/or services for CAV of various manufacturers, various brands, various series, various model years, and various platforms. In some embodiments, the VIU provides automated driving functions and/or services for CAV having an intelligence level from 1 to 5 (e.g., L1, L2, L3, L4, or L5 or V1, V2, V3, V4, or V5), e.g., as defined by SAE. In some embodiments, the VIU provides automated driving functions and/or services for collaborative autonomous driving of a CAV having an authenticated link with an IRIS. In some embodiments, the VIU provides automated driving functions and/or services for a diversity of collaborative autonomous driving task requirements include automated driving in various driving scenarios.

In some embodiments, the sensing and perception fusion module receives and fuses information from onboard subsystems and external systems. In particular, in some embodiments, the sensing and perception fusion module receives vehicle and/or environmental information sensed by the vehicle and vehicle and/or environmental information provided by the cooperative management system of the CADS and fuses the information to provide fused vehicle and/or environmental information and data describing the state of the vehicle and the environment. Thus, in some embodiments, the VIU sensing and perception fusion module fuses information from onboard subsystems and external systems. Similarly, in some embodiments, a fusion module of the CVCS fuses information from onboard subsystems and external systems.

In some embodiments, onboard sensing and perception of a vehicle are provided by the vehicle CVCS. In some embodiments, onboard sensing and perception of a vehicle are provided by the sensing and perception module of the VIU, e.g., when the sensing and perception functions of the CVCS are inadequate, non-functioning, or malfunctioning. In some embodiments, the VIU sensing and perception fusion module receives sensing and perception information from external systems to calibrate the vehicle perception and sensing provided by the VIU and/or CVCS. In some embodiments, when the sensing and perception function of the vehicle CVCS fails, the VIU provides redundant functions by using the sensing and perception information provided by the CADS (e.g., and received from the CADS) to provide perception and sensing information (e.g., supplemental and/or corrected perception and sensing information) to the vehicle provide automated driving, e.g., to maintain normal automated driving operations, maximize safety, and minimize and/or eliminate accidents.

In some embodiments, the collaborative decision-making process is completed by the VIU collaborative decision-making module. In some embodiments, the collaborative decision-making process is completed by the VIU collaborative decision-making module and/or by the decision-making module of the CVCS. Similarly, in some embodiments, the vehicle decision-making process for automated driving is performed by the vehicle CVCS and/or by the VIU. In some embodiments, decision-making for a vehicle is provided by the VIU when the decision-making function of the vehicle CVCS is inadequate, non-functioning, or malfunctioning. Accordingly, when the decision-making functions of the vehicle CVCS fail, the VIU provides redundant decision-making functions to the vehicle by collaborating with the CADS. Thus, the collaborative decision-making module of the VIU collaborates with the CADS to provide driving decisions (e.g., based on the perception fusion results) to provide automated driving, e.g., to maintain normal automated driving operations, maximize safety, and minimize and/or eliminate accidents. The VIU provides functions for collaborative decision-making according to the automated driving needs and intelligence level of the vehicle in which the VIU is installed.

In some embodiments, the intelligent control instruction/auxiliary module receives and uses the fused vehicle and/or environmental information and data describing the state of the vehicle and the environment. In some embodiments, the intelligent control instruction/auxiliary module receives the driving decisions (e.g., the collaborative driving decisions). The fused vehicle and/or environmental information and data describing the state of the vehicle and the environment are used to evaluate the feasibility and priority of the driving decision instructions. In some embodiments, the fused vehicle and/or environmental information and data describing the state of the vehicle and the environment are used to evaluate the feasibility and priority of the driving decision instructions to prevent abnormal performance of automated driving function that could be caused by a conflict between the decisions provided by the CVCS and decisions provided by the VIU. In some embodiments, the fused vehicle and/or environmental information and data describing the state of the vehicle and the environment and/or the driving decisions (e.g., the collaborative driving decisions) are used to generate integrated vehicle control instructions and, in some embodiments, the intelligent control instruction/auxiliary module sends the vehicle control instructions to the vehicle actuator to control the steering wheel to turn, the power system to accelerate or decelerate, the braking system to brake, and/or other vehicle systems (e.g., the vehicle signal light, etc.) In some embodiments, the fused vehicle and/or environmental information and data describing the state of the vehicle and the environment and/or the driving decisions (e.g., the collaborative driving decisions) are used to enhance the vehicle driving performance and/or to improve and/or maximize safety and reliability of CAV automated driving. In some embodiments, the vehicle control instructions are reported to the cooperative management system of the CADS through the communication module, e.g., to coordinate cooperation between the vehicle and the IRIS and/or to coordinate cooperation between the vehicle and the subsystems of the IRIS (e.g., IRT, TCC, TCU, TOC, and/or RIU).

In some embodiments, the VIU provides correction or assistance to the CVCS sensing and perception functions. For example, when the sensing information processing module of the CVCS is inadequate, non-functioning, or malfunctions, the VIU sensing and perception fusion module uses information from external systems to generate fusion perception results to correct and/or assist the vehicle sensing information provided by the CVCS sensing information processing module. Moreover, in some embodiments, onboard sensors are connected to the onboard sensor access and information processing module of the VIU to replace the CVCS sensing functions provided by the CVCS sensing information processing module for vehicle sensing and environment sensing. When the positioning and navigation function of the CVCS is inadequate, non-functioning, or malfunctions, the VIU high-precision map and location identification module provides positioning and navigation services and/or provides corrected positioning and navigation information for the vehicle. In some embodiments, the VIU high-precision map and location identification module replaces the positioning and navigation function of the CVCS when the positioning and navigation function of the CVCS is inadequate, non-functioning, or malfunctions. When the decision-making module of the CVCS is inadequate, non-functioning, or malfunctions, the collaborative decision making module of the VIU replaces the CVCS decision-making module to generate driving decisions based on the sensing information of the vehicle. When the human-computer interaction function of the CVCS is inadequate, non-functioning, or malfunctions, the human-computer interaction interface of the VIU exchanges information with the driver. When the power supply support module of the CVCS is inadequate, non-functioning, or malfunctions, the VIU support system helps the CVCS to restore an adequate power supply.

In some embodiments, automated driving functions are activated and/or provided to a vehicle when a vehicle equipped with a VIU connects to a CADS. First, in some embodiments, the VIU provides a bridge configured to connect the CADS with the vehicle and the VIU provides a functionality for the vehicle to receive, implement, and execute driving instructions provided by the cooperative management system of the CADS. The cooperative management system of the CADS coordinates with the IRIS, an IRIS subsystem (e.g., IRT or RIU), and/or roadside infrastructure (e.g., traffic lights) using vehicle driving information and control instructions transmitted by the VIU to the CADS to provide collaborative automated driving for a CAV. Second, in some embodiments, the vehicle (e.g., as part of the road traffic flow) collects sensing information comprising road condition information (e.g., partial road condition information), wherein the sensing information collected by the vehicle is transmitted to the IRIS or an IRIS subsystem (e.g., IRT or RIU) to provide road condition information to the CADS. In some embodiments, first partial road condition information sent by a first vehicle to CADS is used by the CADS to complement second partial road condition information sent by a second vehicle to CADS. In some embodiments, a plurality of partial road information datasets is provided to and/or received by CADS from a plurality of vehicles and CADS fuses the partial road information datasets to provide a complete road information dataset. Third, in some embodiments, the VIU reports the origin and destination information to the system map of the CADS and proposes positioning and navigation requirements to the system map of the CADS. The cooperative management system of the CADS retrieves roadway information for the specific route proposed for vehicle travel based on the map information. Fourth, in some embodiments, sensing information collected by onboard subsystem of the vehicle is transmitted to the cooperative management system of the CADS and the CADS shares the sensing information with other vehicles.

In some embodiments, information transmitted by the VIU and/or users to CADS is shared by CADS with one or more other users of the CADS, wherein the users include cloud platforms, roadside infrastructure, communication devices, and other vehicles equipped with a VIU and connected to the CADS. VIU and/or users transmit information through the communication network to the CADS. In some embodiments, the CADS integrates and/or fuses information and data received by CADS and sends integrated and/or fused data to the users and/or VIU through the communication network.

In some embodiments, the VIU system cooperates with the CVCS to provide automated driving for a CAV. For example, in some embodiments, the CVCS generates driving decisions and vehicle control instructions based on information sensed by vehicles and the VIU generates driving decisions and vehicle control instructions based on environmental information. The VIU intelligently integrates the vehicle control instructions generated by the CVCS and by the VIU. In some embodiments, when the CVCS is inadequate, non-functioning, or malfunctioning, the VIU provides a backup onboard unit to provide reliable automated driving functions.

In some embodiments, the VIU complements automated driving functions to provide automated driving in long-tail scenarios. When the vehicle encounters a long-tail scenario (e.g., road incidents; special events; construction and/or work zones; extreme and/or adverse weather; hazardous roads; unclear markings, signing, and/or geometric designs; high concentrations of pedestrians and/or bikes; or a combination of any of the foregoing), modules of the VIU complement the corresponding automated driving functions of the CVCS. For example, the sensing and perception fusion module fuses information from the onboard system of the vehicle, other vehicles, the IRIS or an IRIS subsystem (e.g., IRT or RIU), and/or other systems, and sends the fused information to the collaborative decision-making module of the VIU. The collaborative decision-making module of the VIU generates integrated decision-making instructions to complete automated driving tasks in the long-tail scenario. In some embodiments, the VIU requests and/or obtains resources from the CADS to generate the integrated decision-making instructions. Accordingly, Operating Design Domain (ODD) risks are efficiently solved with the VIU system.

In some embodiments, the VIU system enhances vehicle functionalities (e.g., sensing functions, prediction functions, planning functions, and vehicle control functions). Specifically, in some embodiments, the sensing and perception fusion module of the VIU fuses information from the onboard system of the vehicle, external systems, the cooperative management system of the CADS, and/or the IRIS or an IRIS subsystem (e.g., IRT or RIU) to enhance the sensing and prediction ability of the vehicle comprising the VIU. In some embodiments, the collaborative decision-making module of the VIU collaborates with external systems of the CADS to provide enhanced planning functions. In some embodiments, the intelligent control instruction/auxiliary module combines the instructions generated by the VIU and the instructions generated by the CVCS to generate integrated control instructions to provide enhanced vehicle control.

In some embodiments, the redundancy verification module of the VIU verifies that the transmission of information, driving decisions, and integrated control instructions between the onboard systems and external systems is error-free and/or is error-corrected and resolves contradictions between information types to improve and/or maximize the stability, reliability, and safety of the automated driving system.

In some embodiments, the redundancy verification module of the VIU verifies that there the transmission of driving decisions generated by the VIU is error-free and/or is error-corrected and resolves contradictions between information types to improve and/or maximize the stability, reliability, and safety of the automated driving system.

In some embodiments, the VIU system elevates the intelligence level of a vehicle by enhancing the ability of the automated driving functions of the vehicle, e.g., by using the VIU sensing and perception fusion module, collaborative decision-making module, and/or intelligent control instruction/auxiliary module. Specifically, embodiments provide that the intelligence level of a vehicle at intelligence level 1 can be elevated to intelligence level 2, 3, 4, or 5 by the VIU sensing and perception fusion module and collaborative decision-making module providing additional perception functions and making driving decisions for vehicle longitudinal and lateral control. Embodiments provide that the intelligence level of a vehicle at intelligence level 2 can be elevated to intelligence level 3, 4, or 5 by the VIU sensing and perception fusion module and collaborative decision-making module providing supplemental sensing information for trajectory planning and detailed driving decisions. Embodiments provide that a vehicle at intelligence level 3 can be elevated to intelligence level 4 or 5 by the VIU sensing and perception fusion module providing extra sensing and monitoring of the driver in real-time and the VIU collaborative decision-making module generating driving decisions that cooperate with other vehicles and the IRIS or an IRIS subsystem (e.g., IRT or RIU) in the CADS. Embodiments provide that a vehicle at intelligence level 4 can be elevated to intelligence level 5 by the VIU sensing and perception fusion module providing a broader range of environmental sensing (e.g., providing sensing beyond surrounding object (e.g., buildings)) and the collaborative decision-making module providing more reasonable and safe driving decisions. Embodiments further provide that the safety level of vehicles at intelligence level 5 can be enhanced, and the costs of vehicles at intelligence level 5 can be reduced by using additional sensing information and more predictive driving decisions from the VIU.

In some embodiments, the VIU replaces the automated driving tasks when the CVCS fails (e.g., when the CVCS provides inadequate functions, the CVCS is non-functional, and/or the CVCS is malfunctional). In the case of CVCS failure, the vehicle sensor access and information processing module of the VIU accesses, collects, integrates, and/or generates information sensed by the vehicle and sends the information to the VIU sensing and perception fusion module. Further, the VIU communication module and the information conversion module receive information from external systems and send the information from the external systems to the sensing and perception fusion module. The sensing and perception fusion module fuses the information sensed by the vehicle and the information from external systems to provide fused sensing information and sends the fused sensing information to the collaborative decision making module. The collaborative decision making module generates driving decision-making instructions and sends the driving decision-making instructions to the intelligent control instruction/auxiliary module. The intelligent control instruction/auxiliary module generates comprehensive vehicle control instructions for the vehicle to perform driving tasks.

In some embodiments, e.g., for a CAV at intelligence level 1 (e.g., a CAV that comprises a partial driver assistance system), the VIU collaborates with the CADS to provide complement, enhancement, and/or backup functions for the vehicle. For example, the VIU receives sensing information from the CADS and/or the IRIS or an IRIS subsystem (e.g., IRT or RIU) and provides complementary driving assistance to the vehicle. Then, the VIU receives traffic control information (e.g., traffic signal control timing) from the CADS and/or the IRIS or an IRIS subsystem (e.g., IRT or RIU) and improves the planning and decision-making functionalities of the vehicle.

In some embodiments, e.g., for a CAV at intelligence level 2, the VIU collaborates with the CADS to provide further complement functions for the vehicles. For example, the VIU receives more detailed sensing information and traffic information from the CADS and/or from the IRIS or an IRIS subsystem (e.g., RIU) and provides improved functionalities of driver assistance for the vehicle.

In some embodiments, e.g., for a CAV at intelligence level 3, the VIU collaborates with the CADS to provide further enhancement for the vehicle. For example, the VIU receives optimized sensing information and/or decision-making and control instructions from the CADS and/or the IRIS or an IRIS subsystem (e.g., RIU) to provide and/or improve the planning and control tasks for the vehicle.

In some embodiments, e.g., for a CAV at intelligence level 4, the VIU collaborates with the CADS and/or the IRIS or an IRIS subsystem (e.g., RIU) to provide driving decisions and/or vehicle control instructions for long-tail scenarios and/or to provide information to describe specific areas or road sections for better automated driving service coverage, e.g., to provide additional sensing information for sight blocking areas such as highrise buildings.

In some embodiments, e.g., for a CAV at intelligence level 5, the VIU collaborates with the CADS and/or the IRIS or an IRIS subsystem (e.g., RIU) to provide further information complements and enhancement, e.g. more accurate traffic prediction and smarter route choice.

In some embodiments, a number of functional modules of VIU and CVCS are fused to form parallel, sequential, and crossover architectural relationships in information processing (including sensing fusion, intelligent decision-making, and comprehensive control). In some embodiments, after sensing information, the CVCS transmits the information to the VIU for fusion perception, and the fused information is used by other VIU modules. In some embodiments, the VIU and the CVCS make decisions based on the perception fusion and positioning information and output the decision-making results to the next module to improve decision-making capabilities. In some embodiments, the VIU and the CVCS pass control decisions and the logic used to generate control decisions to each other to improve decision-making capabilities.

Automated Driving Systems (ADS)

In some embodiments, the technology provides improvements (e.g., a VIU) for a vehicle operations and control system (e.g., a CAVH and technologies as described herein). In some embodiments, the CAVH comprises one or more of a roadside intelligent unit (RIU) network; a Traffic Control Unit (TCU), a Traffic Control Center (TCC); a TCU/TCC network; a vehicle intelligent unit (VIU) (e.g., a vehicle comprising a VIU); and/or a Traffic Operations Center (TOC). In some embodiments, the system comprises multiple kinds of sensors and computation devices on CAV and infrastructure (e.g., roadside infrastructure) and is configured to integrate sensing, prediction, planning, and control for automated driving of CAV.

In some embodiments, the technology relates to an ADS provided as a connected and automated vehicle highway (CAVH) system, e.g., comprising one or more components of an intelligent road infrastructure system (IRIS) (see, e.g., U.S. Pat. No. 10,867,512 and 10,380,886, each of which is incorporated herein by reference). In some embodiments, the ADS is provided as or supports a distributed driving system (DDS), intelligent roadside toolbox (IRT), and/or device allocation system (DAS) (see, e.g., U.S. Pat. App. Ser. Nos. 16/996,684; 63/004,551; and 63/004,564, each of which is incorporated herein by reference). In some embodiments, the term "roadside intelligent unit" and its abbreviation "RIU" are used to refer to the components named a "roadside unit" and its abbreviation "RSU", respectively, as described for the CAVH technology in, e.g., U.S. Pat. No. 10,867,512 and 10,380,886, each of which is incorporated herein by reference.

The technology described herein relates to a VIU and improvements to VIU technologies. In some embodiments, the term "vehicle intelligent unit" and its abbreviation "VIU" are used to refer to the components named an "onboard unit" and its abbreviation "OBU", respectively, as described for the CAVH technology in, e.g., U.S. Pat. No. 10,867,512 and 10,380,886, each of which is incorporated herein by reference. In some embodiments, the term "vehicle intelligent unit" and its abbreviation "VIU" are used to refer to the components named an "onboard intelligent unit" and its abbreviation "OIU", respectively, as described in U.S. Pat. App. Ser. No. 63/042,620, incorporated herein by reference.

In some embodiments, the technology provides a system (e.g., a vehicle operations and control system comprising a RIU and/or an RIU network; a TCU/TCC network; a vehicle comprising an vehicle intelligent unit; a TOC; and/or a cloud-based platform configured to provide information and computing services (see, e.g., U.S. patent application Ser. No. 16/454,268, incorporated herein by reference)) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RIU network comprises an RIU subsystem. In some embodiments, the RIU subsystem comprises a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, the communication module communicates using wired or wireless media.

In some embodiments, the sensing module comprises a radar based sensor. In some embodiments, the sensing module comprises a vision based sensor. In some embodiments, the sensing module comprises a radar based sensor and a vision based sensor and wherein the vision based sensor and the radar based sensor are configured to sense the driving environment and vehicle attribute data. In some embodiments, the radar based sensor is a LIDAR, microwave radar, ultrasonic radar, or millimeter radar. In some embodiments, the vision based sensor is a camera, infrared camera, or thermal camera. In some embodiments, the camera is a color camera.

In some embodiments, the sensing module comprises a global navigation satellite system (GNSS). In some embodiments, the sensing module comprises an inertial navigation system. In some embodiments, the sensing module comprises a satellite based navigation system and an inertial navigation system and the sensing module and/or the inertial navigation system are configured to provide vehicle location data. In some embodiments, the GNSS is, e.g., the Global Positioning System developed by the United States, Differential Global Positioning System (DGPS), BeiDou Navigation Satellite System (BDS) System, GLONASS Global Navigation Satellite System), European Union Galileo positioning system, the NavIC system of India, and the Quasi-Zenith Satellite System (QZSS) of Japan.

In some embodiments, the sensing module comprises a vehicle identification device. In some embodiments, the vehicle identification device comprises RFID, Bluetooth, Wi-fi (IEEE 802.11), a cellular network radio (e.g., a 4G, 5G, 6G, or 7G cellular network radio), a dedicated short-range communication technology (DSRC); or C-V2X communications system.

In some embodiments, the RIU subsystem is deployed at a fixed location near a road comprising automated lanes and, optionally, human-driven lanes. In some embodiments, the RIU subsystem is deployed at a fixed location near road infrastructure. In some embodiments, the RIU subsystem is deployed near a highway roadside, a highway onramp, a highway offramp, an interchange, intersection, a bridge, a tunnel, a toll station, or on a drone over a critical location. In some embodiments, the RIU subsystem is deployed on a mobile component. In some embodiments, the RIU subsystem is deployed on a vehicle drone over a critical location, on an unmanned aerial vehicle (UAV), at a site of traffic congestion, at a site of a traffic accident, at a site of highway construction, and/or at a site of extreme weather. In some embodiments, an RIU subsystem is positioned according to road geometry, traffic amount, traffic capacity, vehicle type using a road, road size, and/or geography of the area. In some embodiments, the RIU subsystem is installed on a gantry (e.g., an overhead assembly, e.g., on which highway signs or signals are mounted). In some embodiments, the RIU subsystem is installed using a single cantilever or dual cantilever support.

In some embodiments, the TCC network is configured to provide traffic operation optimization, data processing, and archiving. In some embodiments, the TCC network comprises a human operations interface. In some embodiments, the TCC network is a macroscopic TCC, a regional TCC, or a corridor TCC based on the geographical area covered by the TCC network. See, e.g., U.S. Pat. Nos. 10,380,886; 10,867,512; 10,692,365; and U.S. Pat. App. Pub. Nos. 20200005633 and 20200021961, each of which is incorporated herein by reference.

In some embodiments, the TCU network is configured to provide real-time vehicle control and data processing. In some embodiments, the real-time vehicle control and data processing are automated based on preinstalled algorithms. In some embodiments, the TCU network comprises a segment TCU or a point TCU based on based on the geographical area covered by the TCU network. In some embodiments, the system comprises a point TCU physically combined or integrated with an RIU. In some embodiments, the system comprises a segment TCU physically combined or integrated with a RIU. See, e.g., U.S. Pat. Nos. 10,380,886; 10,867,512; 10,692,365; and U.S. Pat. App. Pub. Nos. 20200005633 and 20200021961, each of which is incorporated herein by reference.

In some embodiments, the TCC network comprises macroscopic TCCs configured to process information from regional TCCs and provide control targets to regional TCCs; regional TCCs configured to process information from corridor TCCs and provide control targets to corridor TCCs; and corridor TCCs configured to process information from macroscopic and segment TCUs and provide control targets to segment TCUs. See, e.g., U.S. Pat. Nos. 10,380,886; 10,867,512; 10,692,365; and U.S. Pat. App. Pub. Nos. 20200005633 and 20200021961, each of which is incorporated herein by reference. In some embodiments, the TCU network comprises segment TCUs configured to process information from corridor and/or point TOCs and provide control targets to point TCUs; and point TCUs configured to process information from the segment TCU and RIUs and provide vehicle-based control instructions (e.g., detailed and time-sensitive control instructions for individual vehicles) to an RIU. See, e.g., U.S. Pat. Nos. 10,380,886; 10,867,512; 10,692,365; and U.S. Pat. App. Pub. Nos. 20200005633 and 20200021961, each of which is incorporated herein by reference.

In some embodiments, the RIU network provides vehicles with customized traffic information and control instructions (e.g., detailed and time-sensitive control instructions for individual vehicles) and receives information provided by vehicles.

In some embodiments, the TCC network comprises one or more TCCs comprising a connection and data exchange module configured to provide data connection and exchange between TCCs. In some embodiments, the connection and data exchange module comprises a software component providing data rectify, data format convert, firewall, encryption, and decryption methods. In some embodiments, the TCC network comprises one or more TCCs comprising a transmission and network module configured to provide communication methods for data exchange between TCCs. In some embodiments, the transmission and network module comprises a software component providing an access function and data conversion between different transmission networks within the cloud platform. In some embodiments, the TCC network comprises one or more TCCs comprising a service management module configured to provide data storage, data searching, data analysis, information security, privacy protection, and network management functions. In some embodiments, the TCC network comprises one or more TCCs comprising an application module configured to provide management and control of the TCC network. In some embodiments, the application module is configured to manage cooperative control of vehicles and roads, system monitoring, emergency services, and human and device interaction.

In some embodiments, TCU network comprises one or more TCUs comprising a sensor and control module configured to provide the sensing and control functions of an RIU. In some embodiments, the sensor and control module is configured to provide the sensing and control functions of radar, camera, RFID, and/or V2I (vehicle-to-infrastructure) equipment. In some embodiments, the sensor and control module comprises a DSRC, GPS, 4G, 5G, 6G, 7G, and/or wireless (e.g., IEEE 802.11) radio. In some embodiments, the TCU network comprises one or more TCUs comprising a transmission and network module configured to provide communication network function for data exchange between an automated vehicle and a RIU. In some embodiments, the TCU network comprises one or more TCUs comprising a service management module configured to provide data storage, data searching, data analysis, information security, privacy protection, and network management. In some embodiments, the TCU network comprises one or more TCUs comprising an application module configured to provide management and control methods of an RIU. In some embodiments, the management and control methods of an RIU comprise local cooperative control of vehicles and roads, system monitoring, and emergency service. In some embodiments, the TCC network comprises one or more TCCs further comprising an application module and the service management module provides data analysis for the application module. In some embodiments, the TCC network comprises one or more TCUs further comprising an application module and the service management module provides data analysis for the application module.

In some embodiments, the TOC comprises interactive interfaces. In some embodiments, the interactive interfaces provide control of the TCC network and data exchange. In some embodiments, the interactive interfaces comprise information sharing interfaces and vehicle control interfaces. In some embodiments, the information sharing interfaces comprise an interface that shares and obtains traffic data; an interface that shares and obtains traffic incidents; an interface that shares and obtains passenger demand patterns from shared mobility systems; an interface that dynamically adjusts prices according to instructions given by the vehicle operations and control system; and/or an interface that allows a special agency (e.g., a vehicle administrative office or police) to delete, change, and/or share information. In some embodiments, the vehicle control interfaces comprise an interface that allows a vehicle operations and control system to assume control of vehicles; an interface that allows vehicles to form a platoon with other vehicles; and/or an interface that allows a special agency (e.g., a vehicle administrative office or police) to assume control of a vehicle. In some embodiments, the traffic data comprises vehicle density, vehicle velocity, and/or vehicle trajectory. In some embodiments, the traffic data is provided by the vehicle operations and control system and/or other shared mobility systems. In some embodiments, traffic incidents comprise extreme conditions, major and/or minor accident, and/or a natural disaster. In some embodiments, an interface allows the vehicle operations and control system to assume control of vehicles upon occurrence of a traffic event, extreme weather, or pavement breakdown when alerted by the vehicle operations and control system and/or other shared mobility systems. In some embodiments, an interface allows vehicles to form a platoon with other vehicles when they are driving in the same automated vehicle dedicated lane.

In some embodiments, the VIU comprises a communication module configured to communicate with an RIU. In some embodiments, the VIU comprises a communication module configured to communicate with another VIU. In some embodiments, the VIU comprises a data collection module configured to collect data from external vehicle sensors and internal vehicle sensors; and to monitor vehicle status and driver status. In some embodiments, the VIU comprises a vehicle control module configured to execute control instructions for driving tasks. In some embodiments, the driving tasks comprise car following and/or lane changing. In some embodiments, the control instructions are received from an RIU. In some embodiments, the VIU is configured to control a vehicle using data received from an RIU. In some embodiments, the data received from the RIU comprises vehicle control instructions (e.g., detailed and time-sensitive control instructions for individual vehicles); travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, a VIU is configured to send data to an RIU. In some embodiments, the data sent to the RIU comprises driver input data; driver condition data; and/or vehicle condition data. In some embodiments, the driver input data comprises origin of the trip, destination of the trip, expected travel time, and/or service requests. In some embodiments, the driver condition data comprises driver behaviors, fatigue level, and/or driver distractions. In some embodiments, the vehicle condition data comprises vehicle ID, vehicle type, and/or data collected by a data collection module.

In some embodiments, the VIU is configured to collect data comprising vehicle engine status; vehicle speed; surrounding objects detected by vehicles; and/or driver conditions. In some embodiments, the VIU is configured to assume control of a vehicle. In some embodiments, the VIU is configured to assume control of a vehicle when the automated driving system fails. In some embodiments, the VIU is configured to assume control of a vehicle when the vehicle condition and/or traffic condition prevents the automated driving system from driving the vehicle. In some embodiments, the vehicle condition and/or traffic condition is adverse weather conditions, a traffic incident, a system failure, and/or a communication failure.

EXAMPLE

When a driver drives a Connected Automated Vehicle (CAV) with a CVCS and a Vehicle Intelligent Unit (VIU), the driver enters destination information and selects automated driving functions (e.g., automated car following, adaptive cruise control, automated lane change, or fully automated driving mode, etc.) using the human-computer interaction module of the VIU (e.g., using a microphone to input voice commands, using a function selection button, using a touch screen, etc.)

Examples of a CVCS that provide various intelligence levels or automation levels are provided by the following companies or vehicle platforms:
Intelligence Level 4: Google Waymo, GM Cruise, Argo AI, Amazon Zoox
Intelligence Level 3: Audi A8 Traffic Jam Pilot, Honda Legend Traffic Jam Pilot, Cadillac CT5 Super Cruise, BMW Traffic Jam Assistant
Intelligence Level 2: Tesla Autopilot for Model 3 or Tesla FSD The VIU establishes connections with roadside servers of a Connected Automated Highway (CAH) equipped with IRIS, IRT, or RIU infrastructure or devices (e.g., roadside lidar, camera, radar, edge computing devices, roadside perception result generation equipment, roadside communication equipment, intelligent roadside equipment with traffic control and operation functions, and/or intelligent traffic lights, etc.) through communication networks (e.g., 4G, 5G, 6G, 7G cellular networks; dedicated short-range communication technology DSRC; or C-V2X, etc.) and logs into the cloud system. The supporting modules of VIU maximize and/or ensure the security and reliability of the communication network and user privacy and guarantee the reliable and stable power supply of each module of VIU. The communication model of VIU uses 4G, 5G, 6G, and/or 7G cellular networks; dedicated short-range communication technology (DSRC); and/or C-V2X technology to communicate and/or interact with other vehicles equipped with VIU, the IRIS, an IRIS subsystem (e.g., IRT or RIU), and/or the cloud system.

The information conversion module of VIU performs protocol conversion on the information under different vehicle-road environments, encodes the information obtained by the communication module according to the built-in coding dictionary (e.g., NRZ coding, Manchester coding, Miller code, matrix coding, etc.), and sends information to relevant modules for processing.

The driver selects the automatic driving function and enters the destination information through the human-computer interaction module. The high precision map and location identification module of the VIU reads the high-precision map and positioning navigation information (e.g., maps containing information about vehicles, buildings, pedestrians, real-time geographic coordinates of vehicles, geographic coordinates of origins and destinations, and navigation routes, etc.) from the cloud system through the communication network (e.g., 4G, 5G, 6G, 7G cellular networks; dedicated short-range communication technology DSRC; or C-V2X, etc.) and sends the high-precision map and positioning navigation information to the sensing and perception fusion module.

The onboard sensor access and information processing module of VIU obtains point cloud data collected by lidar, distance data collected by millimeter-wave radar or microwave radar, image data collected by on-board cameras, and/or electrical signals from other vehicle sensors through the CAN bus or Ethernet, and sends the data and information to the sensing and perception fusion module after processing.

The sensing and perception fusion module of the VIU receives vehicle perception results (e.g., vehicle speed; acceleration and/or deceleration; vehicle position, presence of other vehicles, pedestrians, or obstacles near the vehicle; lane recognition; identification of the color of traffic lights on the route; etc.) generated by the onboard control system through the CAN bus and receives environment perception results from the CADS, the IRIS, or an IRIS subsystem (e.g., IRT or RIO comprising, e.g., weather conditions, road congestion data, the position and speed of other vehicles on the road, presence of other vehicles to avoid by changing lanes or turning, presence of pedestrians on the road, traffic light state (e.g., color), presence of tall buildings on one or both sides of the road blocking the view, presence of road markings and visibility of road markings (e.g., presence of dirt, rain, or snow covering road markings), presence of obstacles on the road, presence of emergencies on the road, etc.)

The sensing and perception fusion module of the VIU obtains high-definition map information from the high-precision map and location identification module. The high-precision map and location identification module provides information relating to recognizing current driving scenes (e.g., congested cities, busy intersections, or long and/or busy highways, etc.); information about road conditions outside the vehicle perception range and/or out of the driver line of sight; the impact of weather on traffic; the vehicle position on the road; real-time changes in speed; navigation route; countdown time of traffic lights in the forward direction of the vehicle; changes in the position and speed of other vehicles in the target lane when the vehicle changes lanes; prediction of dangerous situations, etc.

The VIU uses the communication module to send fusion perception results (e.g., comprising driving data of the vehicle and the surrounding environment perception information of the roadway) to the cloud platform of the CADS, and the cloud platform performs path planning and makes driving decisions and sends the driving decision results to the VIU using the communication module.

The collaborative decision-making module of the VIU receives fusion results from the sensing and perception fusion module to determine the drivable area and plans the route based on image recognition and other technologies.

The collaborative decision-making module also recognizes and predicts changes in the driving environment based on perception information received from the external systems and generates driving decisions (e.g., decision making and planning for the driving route and vehicle control commands, which are used to adjust parameters of the engine/motor and control actuators such as accelerator, brakes, steering, turn signals, etc.) to be sent to the intelligent control instruction/auxiliary module.

The intelligent control instruction/auxiliary module of the VIU gathers decision instructions generated by the onboard control system of the CVCS through the CAN bus, combines the decision instructions generated by the VIU collaborative decision-making module and the fusion results to generate comprehensive control instructions, and sends them to the electronic control unit (ECU) of each actuator through the CAN bus to control the engine, brakes, steering actuators, signal lights, and other actuators to achieve automatic driving functions. At the same time, comprehensive control instructions are sent to the communication module and to the CADS, the IRIS or an IRIS subsystem (e.g., IRT or RIU), and the cloud platform via the communication network.

The redundancy verification module of the VIU provides information exchange for other modules, e.g., by reading and identifying a redundancy check code in the data exchanged to ensure the accuracy of data transmission.

The human-computer interaction module of the VIU uses image and voice generation technologies to display fusion results, VIU working status, vehicle driving status, and other information to the driver, and uses voice recognition technologies to collect driver voice commands, and facial and motion recognition technologies to determine the status of the driver.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A vehicle intelligent unit (VIU) comprising:
   a sensing and perception fusion module;
   a collaborative decision-making module; and
   an intelligent control instruction/auxiliary module; wherein
   the collaborative decision-making module generates decisions that support longitudinal and/or lateral vehicle control to provide partial automated driving for a vehicle of intelligence level 1;
   the collaborative decision making module provides trajectory planning decisions and detailed driving decisions; and transmits driver override decisions using information from a vehicle of intelligence level 2;
   the collaborative decision-making module collaborates with external systems to generate decisions for a vehicle of intelligence level 3;
   the collaborative decision-making module generates decisions in collaboration with the external systems to address long-tail scenarios for a vehicle of intelligence level 4; and
   the collaborative decision-making module improves predictive decisions and trajectory planning based on perception results for a vehicle of intelligence level 5;
   wherein the sensing and perception fusion module fuses the sensing and perception information provided by the vehicle subsystem and the sensing and perception information provided by external systems to provide fused sensing and perception information;
   wherein the external system is configured to be a component of a collaborative automated driving system (CADS) that is separate from and/or outside of the vehicle, comprising another vehicle, a road system, a cloud, or an edge computing device;
   wherein the VIU is configured to fuse sensing and perception information from a roadside unit (RSU) and the VIU;
   wherein the VIU is configured to complement, enhance, backup, elevate, and replace automated driving functions of the conventional vehicle control system (CVCS) of the vehicle;
   wherein the VIU is configured to elevate a vehicle intelligence level, wherein
   a) an intelligence level of a vehicle having intelligence level 1 is elevated to intelligence level 2, 3, 4, or 5;
   b) an intelligence level of a vehicle having intelligence level 2 is elevated to intelligence level 3, 4, or 5;
   c) an intelligence level of a vehicle having intelligence level 3 is elevated to intelligence level 4 or 5; and/or
   d) an intelligence level of a vehicle having intelligence level 4 is elevated to intelligence level 5;
   wherein the VIU is configured to replace partial or full automated driving tasks of a CVCS when the CVCS fails or malfunctions;
   wherein when a module in the CVCS fails or malfunctions, a corresponding module in the VIU system substitutes for the failed module in the CVCS.

2. The VIU of claim 1, further comprising:
   a communication module;
   a human-computer interaction module; and/or
   a supporting module.

3. The VIU of claim 2, wherein the communication module manages information exchange between the onboard system and external systems, manages information exchange between the VIU and the CVCS, and manages communication between the VIU subsystems and/or VIU modules.

4. The VIU of claim 1, further comprising:
   an onboard sensor access and information processing module; and
   one or both of:
   an information conversion module; and/or
   a redundancy verification module.

5. The VIU of claim 4, wherein the information conversion module manages information exchange between the onboard system and external systems; and/or manages communication among entities having different data format standards and/or communication protocols.

6. The VIU of claim 1, configured to be installed in a vehicle and provide the vehicle with partial or full automated driving functions.

7. The VIU of claim 1, wherein the sensing and perception fusion module fuses sensing and perception information provided by vehicle sensors and sensing and perception information provided by infrastructure sensors to provide fused sensing and perception information.

8. The VIU of claim 1, wherein the sensing and perception fusion module outputs fused sensing and perception information to the collaborative decision-making module; and
the collaborative decision-making module receives fused sensing and perception information and uses the fused sensing and perception information for decision making, path planning, security identification, and/or generating vehicle control instructions.

9. The VIU of claim 1, wherein the intelligent control instruction/auxiliary module coordinates vehicle control outputs produced by a CVCS and vehicle control outputs produced by the VIU to produce comprehensive control instructions for controlling a vehicle.

10. The VIU of claim 1, wherein the VIU is a subsystem of a collaborative automated driving system (CADS); and the VIU implements CADS functions for the vehicle and executes CADS functions for the vehicle.

11. The VIU of claim 10, wherein the CADS provides external perception, decision-making, and vehicle control information and functions.

12. The VIU of claim 10, wherein the CADS receives and processes sensor data describing the vehicle and the driving environment of the vehicle and the CADS provides vehicle control instructions for the vehicle.

13. The VIU of claim 1, configured to transmit information to CADS and share said information with CADS when a vehicle equipped with the VIU connects to the CADS.

14. The VIU of claim 1, wherein the VIU collaborates with a vehicle CVCS to complement, enhance, backup, elevate, and/or replace the automated driving functions of the CVCS of said vehicle.

15. The VIU of claim 1, configured to perform a method for enhancing the sensing, prediction, planning, and control functions of a CVCS, said method comprising:
fusing, by the fusion module of the VIU, sensing data and information to enhance the sensing and prediction ability of the CVCS;
collaborating, by the collaborative decision-making module of the VIU, with CADS to enhance the planning ability of the CVCS; and
fusing, by the intelligent control instruction/auxiliary module of the VIU, instructions from the VIU and the CVCS to generate integrated control instructions, to enhance the control ability of the CVCS.

16. The VIU of claim 1, configured to collaborate with a vehicle CVCS to provide automated driving for a vehicle, wherein:
the CVCS generates driving decisions and control instructions;
the VIU generates driving decisions and control instructions; and
the VIU fuses driving decisions and/or control instructions from the CVCS and VIU.

17. The VIU of claim 16, wherein the VIU generates driving decisions and control instructions in collaboration with the CADS or its subsystems, an intelligent roadside infrastructure system (IRIS), a roadside intelligent unit (RIU), an intelligent roadside toolbox (IRT), and/or roadside infrastructure.

18. The VIU of claim 17, wherein the sensing and perception fusion module and the collaborative decision-making module of the VIU complement the automated driving functions of the CVCS with sensing information, decision-making, and vehicle control instructions provided by the CADS, a CADS subsystem, IRIS, an RIU, an IRT, and/or roadside infrastructure.

\* \* \* \* \*